US008159484B2

(12) United States Patent
Watanabe

(10) Patent No.: US 8,159,484 B2
(45) Date of Patent: Apr. 17, 2012

(54) LIQUID CRYSTAL DEVICE, PIXEL CIRCUIT, ACTIVE MATRIX SUBSTRATE, AND ELECTRONIC APPARATUS

(75) Inventor: Kenya Watanabe, Suwa (JP)

(73) Assignee: Seiko Epson Corporation, Tokyo (JP)

(*) Notice: Subject to any disclaimer, the term of this patent is extended or adjusted under 35 U.S.C. 154(b) by 1085 days.

(21) Appl. No.: 12/039,359

(22) Filed: Feb. 28, 2008

(65) Prior Publication Data

US 2008/0238850 A1 Oct. 2, 2008

(30) Foreign Application Priority Data

Mar. 26, 2007 (JP) ................................ 2007-078758

(51) Int. Cl.
*G06F 3/038* (2006.01)
*G09G 3/18* (2006.01)
*G09G 3/36* (2006.01)

(52) U.S. Cl. ............ 345/208; 345/205; 345/54; 345/90; 345/98

(58) Field of Classification Search .................. 345/211, 345/87, 98, 204, 205, 208
See application file for complete search history.

(56) References Cited

U.S. PATENT DOCUMENTS

| | | | | |
|---|---|---|---|---|
| 5,448,258 | A * | 9/1995 | Edwards | 345/90 |
| 5,701,166 | A * | 12/1997 | Fedorovish et al. | 349/38 |
| 5,712,652 | A * | 1/1998 | Sato et al. | 345/90 |
| 6,404,024 | B1 * | 6/2002 | Ishigaki | 257/401 |
| 6,414,535 | B1 * | 7/2002 | Ooishi | 327/538 |
| 6,456,269 | B2 * | 9/2002 | Hirakata | 345/92 |
| 6,563,480 | B1 * | 5/2003 | Nakamura | 345/82 |
| 6,727,743 | B2 * | 4/2004 | Kusumoto et al. | 327/534 |
| 6,778,162 | B2 * | 8/2004 | Kimura et al. | 345/90 |
| 2002/0175909 | A1 * | 11/2002 | Matsumoto | 345/211 |
| 2003/0025552 | A1 * | 2/2003 | Kusumoto et al. | 327/544 |
| 2003/0187597 | A1 * | 10/2003 | Taguchi et al. | 702/65 |
| 2006/0001634 | A1 * | 1/2006 | Lee et al. | 345/98 |
| 2008/0031037 | A1 * | 2/2008 | Takeda | 365/182 |
| 2008/0117661 | A1 * | 5/2008 | Holtzclaw et al. | 365/96 |
| 2009/0015889 | A1 * | 1/2009 | Fuchikami et al. | 359/11 |

FOREIGN PATENT DOCUMENTS

| | | | |
|---|---|---|---|
| JP | A-05-303077 | | 11/1993 |
| JP | A-08-286710 | | 11/1996 |
| JP | A-2001-337339 | | 12/2001 |
| JP | A-2005-025048 | | 1/2005 |
| JP | A-2005-148453 | | 6/2005 |
| WO | WO 2006082972 | * | 8/2006 |

* cited by examiner

*Primary Examiner* — Richard Hjerpe
*Assistant Examiner* — Alecia D English
(74) *Attorney, Agent, or Firm* — Oliff & Berridge, PLC

(57) ABSTRACT

A liquid crystal device includes a lateral electric field mode liquid crystal element that controls alignment of liquid crystal molecules by applying an electric field in a direction of a substrate plane to a liquid crystal layer. A voltage inverter circuit is provided in each pixel circuit, and inverts a voltage applied to the liquid crystal element by switching the supply of each of the first and second voltages, supplied from a memory circuit, to between a first pixel electrode and a second pixel electrode of the liquid crystal element. A holding capacitor holds a voltage applied to the liquid crystal element. The voltage inverter circuit includes switching elements. One end of the holding capacitor is connected to at least one of a common connecting point of first and second switching elements and a connecting point of third and fourth switching elements.

11 Claims, 19 Drawing Sheets

LIQUID CRYSTAL DEVICE, PIXEL CIRCUIT, ACTIVE MATRIX SUBSTRATE, AND ELECTRONIC APPARATUS

BACKGROUND

1. Technical Field

The present invention relates to a liquid crystal device, a pixel circuit, an active matrix substrate, and an electronic apparatus.

2. Related Art

A reflective liquid crystal device is, for example, installed in an electronic apparatus, such as a cellular phone terminal, a notebook personal computer or a reflective projector. The reflective liquid crystal device is configured so that a liquid crystal layer is held between a glass or silicon substrate, or the like, that is provided with, for example, data lines, scanning lines, switching elements such as transistors, electric charge storage capacitors, and reflective pixel electrodes formed of aluminum, or the like, and a glass substrate, or the like, that is provided with an opposite electrode, and the like, formed of a transparent conductive film. Because the pixel electrodes are of a reflective type, the switching elements, such as transistors, may be provided under the pixel electrodes. Thus, even when a resolution is increased, the aperture ratio of the panel does not decrease and, therefore, it is relatively easy to achieve both a high resolution and a high luminance.

However, when an analog pixel circuit that holds a pixel voltage by a holding capacitor is used, the voltage value of the holding capacitor decreases with time, so that the lightness and/or contrast of a display image may vary.

To solve the above problem, a liquid crystal device has been proposed in which a 1-bit memory cell is arranged under the reflective pixel electrode of each pixel (which is, for example, described in JP-A-B-286170). In the liquid crystal device that includes such a memory cell in each pixel, an image signal supplied from a corresponding one of data lines is latched by the memory cell of each pixel and the signal is then applied to the liquid crystal layer of the pixel. Each of the memory cells holds the preceding signal until a new signal is written thereto. In this manner, for example, after a still image has been saved in the memory, another still image is displayed, and thereafter the saved still image is display again. The thus display switching may be performed easily and efficiently. In addition, by digitizing a pixel voltage, it is possible to obtain such an advantageous effect that degradation of display quality due to crosstalk, or the like, hardly occurs.

In the meantime, in order to prevent the occurrence of a so-called burn-in (a phenomenon in which a display image degrades because liquid crystal molecules are aligned in the same specific direction) due to a direct-current voltage applied to the liquid crystal, it is effective that the polarity of a voltage applied to the liquid crystal is inverted periodically (which is, for example, described in JP-A-5-303077).

Meanwhile, in a liquid crystal device that includes a memory cell in each pixel, the configuration of a circuit that inverts a voltage applied to the liquid crystal is, for example, described in JP-A-2005-148453 and JP-A-2005-25048. The technologies described in these publications are the same in that the polarity of a voltage applied to one of electrodes of the liquid crystal and a voltage applied to an opposite electrode (common electrode) is inverted periodically. Note that, in the technology described in JP-A-2005-148453, the supply of complementary signals acquired from an SRAM to the liquid crystal is switched by turning on/off of transistors. On the other hand, in the technology described in JP-A-2005-25048, when an offset occurs at the time when a voltage applied to the liquid crystal is inverted, it causes a burn-in. Thus, an offset voltage of the voltage applied to the opposite electrode (common electrode) fine adjusted so that a response waveform acquired from an optical sensor becomes the same in every field.

Another example of a liquid crystal device has been known, in which alignment of liquid crystal molecules is controlled by applying a liquid crystal layer with an electric field in a direction of the substrate plane (hereinafter, referred to as "lateral electric field mode"), and, depending on the form of electrodes that apply an electric field to the liquid crystal, it may be called an IPS (In-Plane Switching) mode, an FFS (Fringe-Field Switching) mode, or the like (which is, for example, described in JP-A-2001-337339). The lateral electric field mode liquid crystal controls the state of transmission of light by rotating horizontally aligned liquid crystal molecules in a lateral direction. Because the liquid crystal molecules are never inclined in a vertical direction, variation in luminance and/or variation in color depending on a viewing angle are small. Thus, the lateral electric field mode liquid crystal is used when a high viewing angle characteristic and a high-quality color developing property are required.

To prevent burn-in of a liquid crystal, it is necessary to prevent a direct-current voltage from being applied to the liquid crystal over a long period of time. FIG. 18A and FIG. 18B are views that show the operation necessary to prevent the occurrence of burn-in in a liquid crystal device, in which FIG. 18A is a view that shows the operation when a voltage is applied to a liquid crystal, and FIG. 18B is a view that shows the operation when no voltage is applied to the liquid crystal. In FIG. 18A and FIG. 18B, a liquid crystal of a type in which an electric field is applied to a liquid crystal layer vertically to the substrate plane (for example, a TN liquid crystal) is used.

As shown in FIG. 18A, when a voltage is applied to a liquid crystal 400, the polarity of a voltage applied to the liquid crystal is, for example, periodically inverted in order to prevent the occurrence of burn-in. That is, the polarity of a voltage applied to the terminals X1 and X2 shown in the drawing is switched periodically. Note that the liquid crystal 400 includes a lower electrode Lp and an upper electrode (common electrode) LCcom.

In addition, as shown in FIG. 18B, in order to prevent the occurrence of burn-in when no voltage is applied to the liquid crystal 400, it is important not to produce a direct-current offset in such a manner that the lower electrode Lp and the upper electrode (common electrode) LCcom are short-circuited to be equipotential. Note that, in FIG. 18B, for the sake of convenience, the electrodes of the liquid crystal is short-circuited using a switch SW1; however, the short circuit of the electrodes of the liquid crystal 400 is actually performed by applying the same voltage to each of the electrodes.

However, in the liquid crystal device that includes a memory circuit in each pixel, it is actually difficult to perform the ideal operation described schematically in FIG. 18A and FIG. 18S (operation to invert polarity and operation to short-circuit the electrodes for preventing burn-in).

FIG. 19A to FIG. 19C are views that illustrate problems, in a liquid crystal device that includes a memory circuit in each pixel circuit, when voltages applied to the electrodes of a liquid crystal are inverted.

The mode in which voltages applied to the electrodes of the liquid crystal are inverted includes a method, as shown in FIG. 19A, in which the voltage (Vcom) applied to the opposite electrode (common electrode) LCcom is fixed and the polarity of the voltage (Vp) applied to the lower electrode Lp is inverted, and a method, as shown in FIG. 19B, in which the voltage (Vp) applied to the lower electrode Lp and the voltage (Vcom) applied to the common electrode LCcom are interchanged at the same time. Note that, in FIG. 19A to FIG. 19C, voltages applied to the liquid crystal are respectively set to "5 V" and "0 V".

When the method shown in FIG. 19A is employed, it is convenient because it is not necessary to change the voltage (Vcom=0 V) applied to the opposite electrode (common electrode) LCcom; however, the voltage (Vp) applied to the lower electrode Lp needs to be changed relative to the voltage Vcom. As a result, it is required to use a negative power supply. It is unrealistic to operate the memory circuit provided in each of the pixels with a negative power supply, so that the method shown in FIG. 19A cannot be employed for the liquid crystal device that uses the memory circuit.

Then, as shown in FIG. 19B, there is no other choice but to employ the method in which the voltage (Vp) applied to the lower electrode Lp and the voltage (Vcom) applied to the common electrode LCcom are interchanged at the same time. In this case, the problem is that, because the opposite electrode (common electrode) LCcom is an electrode that is shared by all the pixels of the liquid crystal device, the entire liquid crystal layer held between the substrates functions as a load capacity and, therefore, a change in voltage will be slow.

That is, as shown in FIG. 19C, in regard to the lower electrode Lp, a load is small because the electrode corresponds to one pixel. Thus, when the voltages applied to both electrodes of the liquid crystal are inverted (at time t1), the voltage (Vp) applied to the lower electrode Lp quickly changes. In contrast, the voltage (Vcom) applied to the opposite electrode (common electrode) LCcom changes slowly because of a heavy load and, as shown in FIG. 19C, a voltage is switched over a transition period T1 (from time t1 to time t2). Accordingly, in the transition period T1, a voltage applied to the liquid crystal gradually changes with time, and a change in transmittance ratio of the liquid crystal in accordance with the change in voltage is recognizable because of the slow change. Thus, a flicker (visual flickering) is likely to occur.

In addition, in order to perform the voltage inversion control shown in FIG. 19B, it is necessary to separately control the voltage Vp and the voltage Vcom by separate control circuits, so that a circuit configuration becomes complex.

FIG. 20A and FIG. 20B are views that illustrate problems, in the liquid crystal device that includes a memory circuit in each pixel circuit, when the electrodes of a liquid crystal are short-circuited (the same electric potential). As shown in FIG. 20A, both electrodes (Lp and LCcom) of the liquid crystal 400 are applied with ground electric potentials (GND1, GND2) from separate circuits (lines). However, the ground electric potentials (GND1, GND2) applied to the electrodes through the separate circuits (lines) may have a relative difference therebetween because a variation in voltage level occurs independently of each other.

Moreover, because the electrodes (Lp and LCcom) of the liquid crystal each have a two-dimensional area and, therefore, their voltages (Vp and Vcom) scatter in the planes of the electrodes. Thus, there is a possibility that a direct-current offset will occur in the electrodes of each pixel.

Accordingly, as shown in FIG. 20B, there is a possibility that a direct-current offset voltage (ΔV) will occur at the electrodes of each pixel of the liquid crystal 400. Note that Vgnd1 and Vgnd2 in the drawing represent voltages of both electrodes of each pixel by taking a voltage scatter in the planes of the electrodes into consideration. Such a direct-current offset voltage ΔV may cause a burn-in.

As described above, in the liquid crystal device that includes a memory circuit in each pixel, it is difficult to perform inversion of an applied voltage for preventing burn-in without occurrence of a flicker and to realize a complete short circuit that does not produce a direct-current offset. In addition, because it is necessary to separately control the voltages applied to the electrodes (Lp and LCcom) of the liquid crystal, a circuit configuration for control becomes complex.

Furthermore, the method to write image data includes a line sequential driving method in which image data are sequentially written to each of the pixel circuits connected to one scanning line and, at the time when writing to all the pixel circuits has been completed, the image data written to each of the pixel circuits are displayed by the liquid crystal, and a frame sequential driving method in which the operation to sequentially write image data to each of the pixel electrodes connected to one scanning line is sequentially performed for the number of scanning lines and, at the time when writing to all the pixel circuits has been completed, the image data written to each of the pixel circuits are displayed by the liquid crystal. However, even with any one of the methods, writing the image data to the pixel circuits will be reflected on the display screen and, therefore, it causes a flicker, or the like.

SUMMARY

An advantage of some aspects of the invention is that an accurate inversion of an applied voltage is realized while a flicker is being suppressed with a simple circuit configuration and a simple control to thereby prevent the occurrence of burn-in, in addition, a short circuit of the electrodes is realized without occurrence of a direct-current offset when no voltage is applied to a liquid crystal, and, furthermore, line sequential driving or frame sequential driving may be performed while the operation in which data are written in units of one scanning line or the operation in which data are written in units of one frame does not influence a screen when display data is updated in each pixel circuit.

(1) An aspect of the invention provides a liquid crystal device. The liquid crystal device includes a lateral electric field mode liquid crystal element, a memory circuit, a voltage inverter circuit, and a holding capacitor. The lateral electric field mode liquid crystal element controls alignment of liquid crystal molecules by applying an electric field in a direction of a substrate plane to a liquid crystal layer, and includes a first pixel electrode and a second pixel electrode. The memory circuit is provided in each pixel circuit and functions as a source to supply a first voltage and a second voltage. The voltage inverter circuit is provided in each pixel circuit, and inverts a voltage applied to the liquid crystal element by switching the supply of each of the first and second voltages, supplied from the memory circuit, to between the first pixel electrode and the second pixel electrode of the liquid crystal element. The holding capacitor holds a voltage applied to the liquid crystal element. The voltage inverter circuit includes a first switching element, a second switching element, a third switching element, and a fourth switching element. The first switching element and the second switching element are connected in series between an end of the memory circuit, from which the first and second voltages are supplied, and a reference power supply electric potential. The third switching element and the fourth switching element are connected in series between the end of the memory circuit, from which the first and second voltages are supplied, and the reference power supply electric potential. One end of the holding capacitor is connected to at least one of a common connecting point of the first and second switching elements and a connecting point of the third and fourth switching elements. In addition, the first pixel electrode and the second pixel electrode of the liquid crystal element are respectively connected to the common connecting point of the first and second switching elements and the common connecting point of the third and fourth switching elements. Whether to selectively turn on the first and fourth switching elements, to selectively turn on the second and third switching elements, or to turn off all the first to fourth switching elements, are controlled by switch control signals.

The lateral electric field mode liquid crystal has such a structure that two electrodes corresponding to one pixel are arranged on one of two substrates that interpose the liquid crystal in between, and, in comparison to the case where a common electrode (LCcom) shared by all the pixels is used as in the case of a TN liquid crystal, a load capacity is small (that is, a load capacity of each pixel of the lateral electric field mode liquid crystal is only a capacity corresponding to one pixel). Thus, when voltages applied to the liquid crystal are inverted, the voltage applied to each of the electrodes quickly changes. In the aspect of the invention, focusing on the above characteristic of the lateral electric field mode liquid crystal, the lateral electric field mode liquid crystal is actively employed. In addition, the memory circuit only functions as a voltage supply source, and the exclusive voltage inverter circuit performs inversion of voltages applied to the liquid crystal. Thus, a new configuration of a pixel circuit in which the function of supplying voltages and the function of inverting voltages are completely separated is employed. The voltage inverter circuit operates on the first voltage or on the second voltage supplied from the memory circuit (for example, a voltage of "5 V (VDD)" or "0 V (GRND)" a corresponding to "1" or "0") as a power supply voltage. That is, the voltage inverter circuit operates in a range between the power supply voltage supplied from the memory circuit (first or second voltage) and the reference power supply electric potential (ground), and switches the supply of the voltage, supplied from the memory circuit (first or second voltage), and the reference power supply voltage (ground), to between the first and second pixel electrodes of the lateral electric field mode liquid crystal (that is, a path to supply each voltage). That is, only the paths to supply voltages are switched, and voltage sources are the same. Thus, voltage values do not change before and after inversion of voltages. Hence, an accurate voltage polarity inversion may be achieved. In addition, even when the voltage level in each pixel slightly changes due to the scatter of the liquid crystal within the plane, because voltage sources in each pixel are the same as described above, voltage values do not change before and after inversion of voltages in that pixel and, as a result, a direct-current offset does not occur in each pixel. In addition, because only the paths to supply voltages are switched, it is possible to realize switching of voltage levels supplied to the first and second pixel electrodes with a simple circuit at a time. It is not necessary to control the voltage Vcom applied to the common electrode and the voltage Vp applied to the lower electrode using separate circuits, adjust the voltages with high accuracy, and synchronize the timing to switch the voltages as in the case of the existing art. The lateral electric field mode liquid crystal quickly changes voltages applied to the electrodes as described above and, therefore, is able to respond quickly. Thus, a phenomenon in which the transmittance ratio of the liquid crystal gradually changes in a transition period of a voltage as in the case of the existing art hardly occurs, so that a flicker is suppressed. In addition, even when the transmittance ratio of the liquid crystal changes with time, the change is quick and, therefore, it is hardly recognized by human eye. In terms of this point as well, a flicker is suppressed. In addition, in a state when the reference power supply voltage of the voltage inverter circuit is, for example, a ground level, when the voltage supplied from the memory circuit is set to 0 V, the voltages applied to both the electrodes of the liquid crystal both become 0 V accurately. Thus, a short circuit is performed when no voltage is applied to the liquid crystal and, at this time, a direct-current offset does not occur.

Moreover, the liquid crystal device according to the aspect of the invention includes the holding capacitor that holds the voltage applied to the liquid crystal element. Thus, in a period when new display data is written to the memory circuit in the pixel circuit, the transistors of the voltage inverter circuit are all turned off using the switch control signals. In this period, by applying the voltage of display data held in the holding capacitor to the liquid crystal element, the preceding display data is continuously displayed on the liquid crystal element, so that writing of display data to the memory circuit does not influence a screen. Thus, it is possible to perform line sequential driving or frame sequential driving without occurrence of a flicker.

(2) In the liquid crystal device according to the aspect of the invention, the holding capacitor may be connected between the common connecting point of the first and second switching elements and the common connecting point of the third and fourth switching elements.

An example of connection of the holding capacitor is described. According to this configuration, it is possible to display the preceding display data continuously on the liquid crystal element in such a manner that, in a period when new display data is written to the memory circuit in the pixel circuit, the input of the voltage inverter circuit is made to enter a floating state to thereby turn off all the switching elements that constitute the voltage inverter circuit, and the voltage of the display data held in the holding capacitor is applied to the liquid crystal element.

(3) In the liquid crystal device according to the aspect of the invention, one end of the holding capacitor may be connected to the common connecting point of the first and second switching elements or the common connecting point of the third and fourth switching elements, wherein the other end of the holding capacitor may be connected to a predetermined direct-current electric potential.

Another example of connection of the holding capacitor is described. According to this configuration, it is possible to display the preceding display data continuously on the liquid crystal element in such a manner that, in a period when new display data is written to the memory circuit in the pixel circuit, the input of the voltage inverter circuit is made to enter a floating state to thereby turn off all the switching elements that constitute the voltage inverter circuit, and the voltage of the display data held in the holding capacitor is applied to the liquid crystal element.

(4) In the liquid crystal device according to the aspect of the invention, each of the first, second, third and fourth switching elements may be formed of the same conductivity type transistor, wherein, in a period when a voltage applied to the liquid crystal element is updated, the first and third switching elements and the second and fourth switching elements may be complementarily driven by the switch control signals having opposite phases from each other, and wherein, in a period when a voltage applied to the liquid crystal element is held in the holding capacitor, the first and third switching elements and the second and fourth switching elements all may be turned off by the switch control signals.

Each of the switching elements is formed of the same conductivity type transistor (including a MOS transistor and a bipolar transistor), turning on of the first to fourth transistors is controlled by the complementary switch control signals, and the switch control signals that are input to the gates of the first to fourth transistors are, for example, all set to a low level. Thus, in a period when the voltage applied to the liquid crystal element is updated, the first to fourth transistors are all turned off. In this manner, a path that connects the memory circuit to the liquid crystal element is disconnected. Thus, in this period, it is possible to update frame data or line data in the memory circuits and, as a result, frame sequential driving or line sequential driving may be performed. The voltage supplied from the memory circuit is directly applied to the source or drain of each of the first to fourth MOS transistors; however, because the withstand voltage between the source and drain of each of the MOS transistors is considerably high, no problem occurs with the withstand voltage. In addition, because the memory circuit is directly connected to the voltage inverter circuit (for example, as described in JP-A-2005-25048, the gate/source channel of the MOS transistor is not connected in a path to supply a voltage to the liquid crystal), the high level side power supply voltage value of the memory circuit and the high level side power supply voltage value of the voltage inverter circuit may be the same, and the gate electric potentials of four transistors that constitute the voltage inverter circuit are supplied by the switch control signals (S0 to Sn, /SO to /Sn) from the outside of the pixel array. Thus, it is possible to supply a selected voltage (a voltage VDD+Vth, which the voltage of VDD supplied from SRAM does not drop by Vth). In the technology described in JP-A-2005-25048, it is necessary to set the voltage supplied from SRAM to VDD+Vth, so that each of the transistors that constitute the SRAM needs to be formed of a high withstand voltage transistor. On the other hand, in the aspect of the invention, it is advantageous in that, even when the high withstand voltage transistors are not used to constitute the SRAM, a VDD voltage may be applied to the liquid crystal through the transistors that constitute the voltage inverter circuit. Note that, in the case of the aspect of the invention, a high voltage, such as (VDD+Vth), is applied to the gates of the transistors that constitute the voltage inverter circuit as S0 to Sn, /S0 to /Sn; however, the voltage withstanding property is generally higher in source/drain (S/D) withstand voltage of a transistor than in gate withstand voltage thereof. Thus, there is no problem. In addition, when the S/D withstand voltage of the transistor is configured to be a high withstand voltage, the structure of the transistor needs to be suitable for high withstand voltage, and, in addition, there may be a problem that the size of S/D of the transistor becomes large. However, when the gate withstand voltage is configured to be a high withstand voltage, it is possible to obtain a high withstand voltage transistor just by increasing the thickness of a gate oxide film. Thus, it is easy to be realized. In addition, the four transistors used for the voltage inverter circuit are intended to apply the liquid crystal with VDD or GND electric potential, so that the size (width and/or length) of the transistors may be selected. However, when the time to charge the liquid crystal is made equal to the time to discharge the liquid crystal, the size of the four transistors are desirably made equal. As described above, in the aspect of the invention, it is not necessary to use a high withstand voltage transistor for transistors that constitute the memory circuit and/or transistors that constitute the voltage inverter circuit, it is possible to form a compact pixel circuit, and the manufacturing process of the device does not become complex. Furthermore, complementary or all low-level switch control signals may be versatilely used for a digital circuit and easily generated.

In addition, according to the above configuration, a voltage of display data is applied to the liquid crystal element and the holding capacitor in a period when a voltage applied to the liquid crystal element is updated in such a manner that the first and fourth switching elements and the second and third switching elements, which are provided in the voltage inverter circuit, are complementarily driven, while, on the other hand, it is possible to display the preceding display data continuously on the liquid crystal element in such a manner that, in a period when new display data is written to the memory circuit in the pixel circuit, the input of the voltage inverter circuit is made to enter a floating state to thereby turn off all the switching elements that constitute the voltage inverter circuit, and the voltage of the display data held in the holding capacitor is applied to the liquid crystal element.

Thus, it is possible to apply a voltage of the preceding display data held in the holding capacitor to the liquid crystal element, new display data is not displayed on the screen in a period when the new display data is written, and data are collectively updated at the time when writing to all the pixel circuits connected to one scanning line has been completed when writing is performed in units of scanning line and when writing to all the pixel circuits connected to all the scanning lines have been completed when writing is performed in units of frame. Thus, it is possible to prevent a flicker, or the like, and thereby possible to realize a high resolution image by means of frame sequential driving or line sequential driving.

(5) In the liquid crystal device according to the aspect of the invention, in a period when display data is written to each memory circuit provided in each of the pixel circuits and connected to the one scanning line, the first and third switching elements and the second and fourth switching elements, which constitute the voltage inverter circuit provided in each of the pixel circuits connected to the one scanning line may be all turned off, wherein, when writing of the display data to each memory circuit provided in each of the pixel circuits and connected to the one scanning line has been completed, the first and second switching elements and the third and fourth switching elements are turned on and a voltage of the updated display data is applied to the liquid crystal element.

The operation when line sequential driving is performed is described. The first to fourth switching elements provided in the voltage inverter circuit are all turned off in a period when new display data is written to each memory circuit provided in each of the pixel circuits connected to one scanning line. Thus, a voltage of display data held in the holding capacitor is applied to the liquid crystal element and the preceding display data is displayed on the liquid crystal element. At the time when the writing has been completed, one of the switch control signals is set to a high level, and the other is set to a low level. Thus, the voltage inverter circuit is driven and, as a result, it is possible to collectively update display data in the liquid crystal element and the holding capacitor with new display data. In this case, because writing operation of display data is performed by means of line sequential driving, the process of writing display data to each of the pixel circuits connected to one scanning line will not be displayed on the screen. Thus, a flicker is prevented and, thereby, the liquid crystal device may have a high resolution display quality.

(6) In the liquid crystal device according to the aspect of the invention, in a period when display data is written to each memory circuit provided in each of the pixel circuits and connected to all the scanning lines, the first and third switching elements and the second and fourth switching elements, which constitute the voltage inverter circuit provided in each of the pixel circuits connected to all the scanning lines, may be all turned off, wherein, when writing of the display data to each memory circuit provided in each of the pixel circuits and connected to all the scanning lines has been completed, the first and second switching elements and the third and fourth switching elements are turned on and, as a result, a voltage of the updated display data is applied to the liquid crystal element.

The operation when frame sequential driving is performed is described. The first to fourth switching elements provided in the voltage inverter circuit are all turned off in a period when new display data is written to each memory circuit provided in each of the pixel circuits connected to all the scanning lines that constitute one screen. Thus, a voltage of display data held in the holding capacitor is applied to the liquid crystal element and the preceding display data is displayed on the liquid crystal element. At the time when the writing to the one screen has been completed, one of the switch control signals is set to a high level, and the other is set to a low level. Thus, the voltage inverter circuit is driven and, as a result, it is possible to collectively update display data in the liquid crystal element and the holding capacitor with new display data. In this case, because writing operation of display data is performed by means of frame sequential driving, the process of writing display data to each of the pixel circuits connected to all the scanning lines will not be displayed on the screen. Thus, a flicker is prevented and, thereby, the liquid crystal device may have a high resolution display quality.

(7) In the liquid crystal device according to the aspect of the invention, each of the memory circuits may be an SRAM memory cell that holds a 1-bit data.

The SRAM cell includes a high resistance SRAM cell that has a flip-flop load formed with high resistance (for example, a resistance formed by ion implantation) and a full CMOS cell that is formed of MOS transistors, including a load. Furthermore, the SRAM cell includes a latch cell that forms a flip-flop using a plurality of inverters.

(8) In the liquid crystal device according to the aspect of the invention, the lateral electric field mode liquid crystal element may be an IPS (In-Plane Switching) mode liquid crystal element.

The IPS mode liquid crystal is used as the lateral electric field mode liquid crystal.

(9) in the liquid crystal device according to the aspect of the invention, the liquid crystal device may be a reflective liquid crystal device, wherein each of the memory circuits and each of the voltage inverter circuits may be arranged in an element forming region below the first and second pixel electrodes formed of a material that reflects light.

In the case of the reflective liquid crystal, it is possible to provide an element forming region below each pixel electrode. Because the voltage inverter circuit according to the embodiment of the invention is simplified, it is not difficult to arrange the memory circuit and the voltage inverter circuit in a space formed below each of the pixel electrodes. Thus, without increasing an area occupied by the pixel circuit, it is possible to form the pixel circuit according to the aspects of the invention.

(10) Another aspect of the invention provides a pixel circuit. The pixel circuit includes a memory circuit, a voltage inverter circuit, and a holding capacitor. The memory circuit functions as a source to supply a first voltage and a second voltage. The voltage inverter circuit inverts a voltage applied to the liquid crystal element by switching the supply of each of the first and second voltages, supplied from the memory circuit, to between the first pixel electrode and the second pixel electrode of the liquid crystal element. The holding capacitor holds a voltage applied to the liquid crystal element at the time when writing of data to the memory circuit has been completed.

The configuration of the pixel circuit, to which the liquid crystal layer has not connected yet, is described.

(11) Yet another aspect of the invention provides an active matrix substrate. The active matrix substrate includes a first pixel electrode, a second pixel electrode, a memory circuit, a voltage inverter circuit, and a holding capacitor. The first pixel electrode and the second pixel electrode are used to apply an electric field to a liquid crystal layer of a lateral electric field mode liquid crystal element. The memory circuit is provided in each pixel circuit and functions as a source to supply a first voltage and a second voltage. The voltage inverter circuit is provided in each pixel circuit and inverts a voltage applied to the liquid crystal element by switching the supply of each of the first and second voltages, supplied from the memory circuit, to between the first pixel electrode and the second pixel electrode of the liquid crystal element. The holding capacitor holds a voltage applied to the liquid crystal element.

The configuration of the active matrix substrate is described.

(12) Further another aspect of the invention provides an electronic apparatus that includes the liquid crystal device according to the aspects of the invention.

The liquid crystal device according to the embodiment of the invention may be, for example, mounted on an electronic apparatus, such as a sub-panel of a cellular phone, a low power consumption notebook personal computer, or a reflective projector. A flicker of a still image in accordance with voltage inversion is suppressed, so that it is possible to display a high-quality image. Moreover, occurrence of a direct-current offset is reduced and, thereby, a burn-in hardly occurs, so that degradation of display image quality with time hardly occurs.

In this manner, according to the aspects of the invention, it is possible to realize inversion of an applied voltage with high accuracy while suppressing a flicker with a simple circuit configuration and a simple control. In addition, it is possible to not only realize a short circuit state that does not produce a direct-current offset when no voltage is applied to the liquid crystal, but also apply a voltage of the preceding display data held in the holding capacitor to the liquid crystal element even in a period when new display data is written. Thus, new data is not displayed on the screen in a period when new display data is being written. At the time when writing to all the pixel circuits connected to one scanning line has been completed when writing is performed in units of scanning line, or at the time when writing to all the pixel circuits connected to all the scanning lines has been completed when writing is performed in units of frame, data are collectively updated, so that a flicker, or the like, is prevented and, as a result, it is possible to realize a high resolution image by means of frame sequential driving or line sequential driving.

As described above, according to the aspects of the invention, an accurate inversion of an applied voltage is realized while a flicker is being suppressed with a simple circuit configuration and a simple control to thereby prevent the occurrence of burn-in. In addition, a short circuit of the electrodes may be performed without occurrence of a direct-current offset when no voltage is applied to the liquid crystal. Furthermore, when display data are updated in pixel circuits, the operation in which data are written in units of one scanning line or the operation in which data are written in units of one frame does not influence a screen to thereby allow line sequential driving or frame sequential driving.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will now be described. Note that the embodiment described below is not intended to limit the scope of the invention recited in the appended claims, and it is not necessary to include all the components described in the embodiment for solution of the invention.

An embodiment of the invention will now be described with reference to the drawings.

First Embodiment

First, the basic configuration of one pixel will be described.

Basic Configuration of One Pixel

Figure 1:
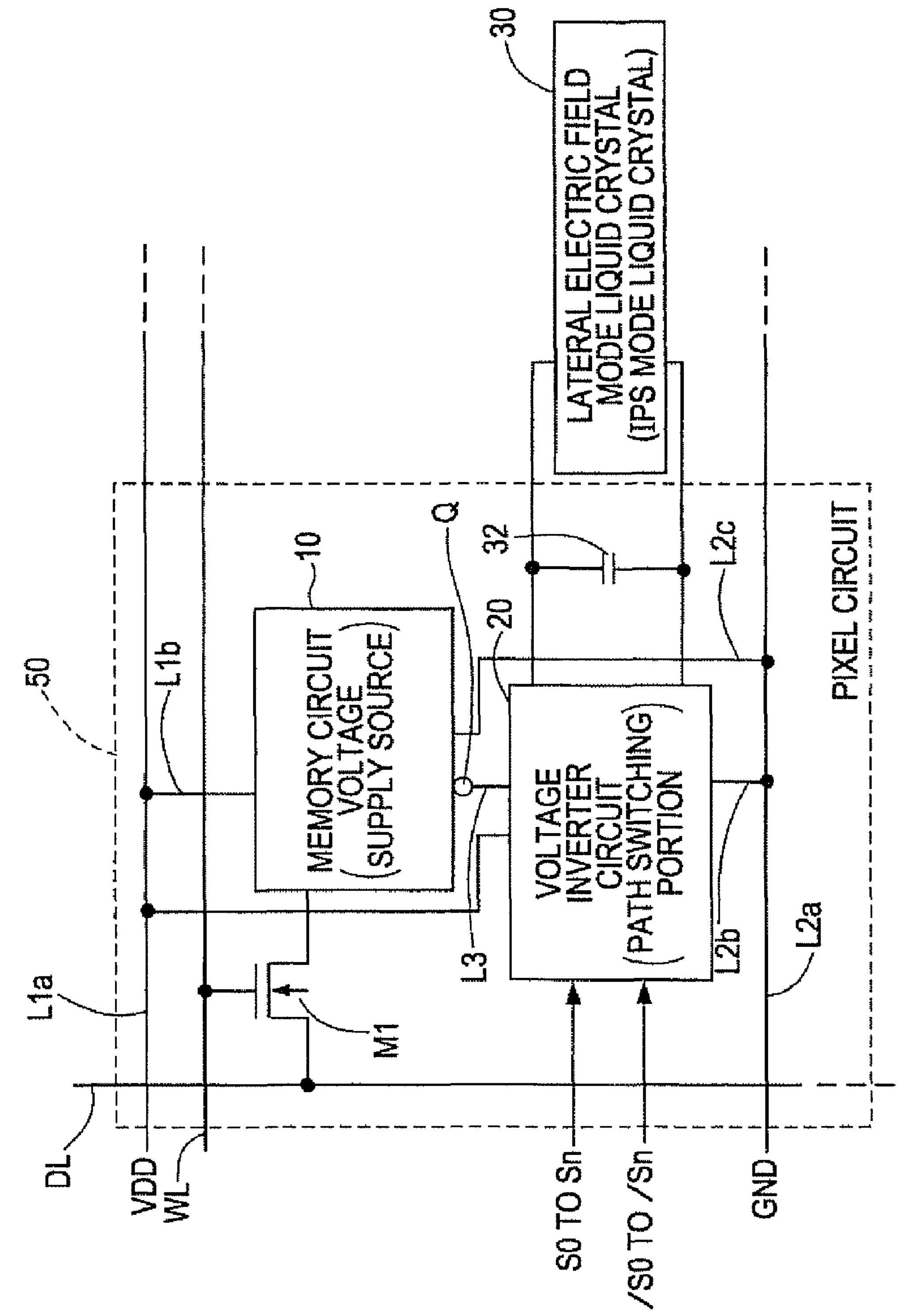
FIG. 1 is a view that shows the configuration of one pixel in a liquid crystal device according to an embodiment of the invention.

FIG. 1 is a view that shows the configuration of one pixel in a liquid crystal device according to an embodiment of the invention. As shown in FIG. 1, the one pixel is configured to include a pixel circuit 50 and a lateral electric field mode liquid crystal (here, an IPS mode liquid crystal is used; however, the liquid crystal is not limited to it) 30.

The lateral electric field mode liquid crystal is a liquid crystal that performs alignment control of liquid crystal molecules by applying a liquid crystal layer with an electric field in a direction of the substrate plane. Depending on the form of the electrodes that apply an electric field to the liquid crystal, an IPS (In-Plane Switching) mode, an FFS (Fringe-Field Switching) mode, and the like, are known. The lateral electric field mode liquid crystal has such a structure that two electrodes corresponding to one pixel are arranged on one of two substrates that interpose the liquid crystal in between, and, in comparison to the case where a common electrode (LCcom) shared by all the pixels is used as a TN liquid crystal, a load capacity is small (that is, a load capacity of each pixel of the lateral electric field mode liquid crystal is only a capacity corresponding to one pixel). Thus, when a voltage applied to the liquid crystal is inverted, the voltage of each electrode quickly changes. In the aspect of the invention, focusing on the above characteristic of the lateral electric field mode liquid crystal, in order to accelerate a change in a voltage applied to each of the electrodes by reducing a load, the lateral electric field mode liquid crystal is actively employed.

Note that the structure of the IPS mode liquid crystal device will be described with reference to FIG. 12 and FIG. 13 later. As is apparent from FIG. 12, the IPS mode liquid crystal device is configured so that first and second pixel electrodes (formed of an optically reflective material) 218*a*, 218*b* are arranged on the side of the same substrate in proximity to each other and an electric field E is applied horizontally in a direction of the substrate plane.

In addition, the pixel circuit 50 includes a pixel selection transistor (NMOS transistor) M1, a memory circuit 10, a voltage inverter circuit (path switching portion) 20, and a holding capacitor 32. The gate of the pixel selection transistor M1 is connected to a corresponding one of scanning lines (WL) and one end (source or drain) thereof is connected to a corresponding one of data lines (DL). The memory circuit 10 functions as a voltage supply source. The voltage inverter circuit 20 is used to invert a voltage applied to each of the electrodes of the liquid crystal. The holding capacitor 32 holds a voltage that is equal to the voltage applied to the electrodes of the liquid crystal.

The memory circuit 10 operates in a range between a high level side power supply voltage (VDD: 5 V) applied through a first power supply line (L1*a*) and a ground electric potential (GND) applied through a second power supply line (L2*a*), A binary voltage corresponding to black or white (for example, a first voltage: VDD (5 V) and a second voltage: GND (0 V)) is written to the memory circuit 10 through the data line (DL). The memory circuit 10 serves to supply a voltage (VDD or GND) written therein to the voltage inverter circuit 20 as a power supply voltage, and is not involved in inversion of a voltage applied to the liquid crystal.

The voltage inverter circuit (path switching portion) 20 is connected between a voltage supply end (Q) of the memory circuit 10 and a reference power supply electric potential (GND). The voltage inverter circuit 20 operates on VDD (5 V) supplied from the memory circuit 10 as a high level side power supply voltage. The low level side power supply voltage (GNU) is supplied through the second power supply line (L2*a*). Switch control signals S0 to Sn, S0 to /Sn, which are in opposite phase, for path switching are input to the voltage inverter circuit 20, and a voltage supply path to the liquid crystal is switched at a timing at which voltage levels of the switch control signals S0 to Sn, /S0 to /Sn are inverted. At this time, for the holding capacitor 32 as well, a voltage supply path to the holding capacitor 32 is switched at this timing. In addition, in a period when new display data is written to the memory circuit 10, each of the switch control signals S0 to Sn is controlled not to become an opposite phase, the input of the voltage inverter circuit is made to enter a floating state, and a voltage of the display data, held in the holding capacitor 32, is applied to the electrodes of the liquid crystal. Then, at the time when writing of the new display data to the memory circuit 10 has been completed, the switch control signals S0 to Sn, /S0 to /Sn, which are in opposite phase, for path switching are input to the voltage inverter circuit 20 again.

As shown in FIG. 1, a line L1*b* supplies the memory circuit 10 with the power supply electric potential VDD of the first power supply line (L1*a*). In addition, a line L2*b* supplies the voltage inverter circuit 20 with the power supply electric potential GND with the second power supply line (L2*a*). In addition, a line L2*c* supplies the memory circuit 10 with the power supply electric potential GND of the second power supply line (L2*a*). Furthermore, a line L3 supplies the voltage inverter circuit 20 with the binary voltage (VDD or GND) output from the voltage supply end (Q) of the memory circuit 10.

The ground line that supplies the memory circuit 10 with a ground electric potential and the ground line that supplies the voltage inverter circuit 20 with a ground electric potential are the same in the pixel circuit 50. That is, the ground lines (L2*a*, L2*b*, L2*c*) are the same ground line (that is, not a ground line that belongs to another system). Thus, the ground electric potential (0 V) supplied from the memory circuit 10 always coincides with the ground electric potential (0 V), which serves as a reference power supply electric potential (GND) of the voltage inverter circuit 20, and there is no relative difference in electric potential (that is, as one of the ground electric potentials varies, the other also varies, so that there is no relative difference in electric potential). This means that a direct-current offset does not occur when the liquid crystal 30 is short-circuited by applying 0 V to the electrodes of the liquid crystal 30 from the voltage inverter circuit 20.

Example of Configuration of Memory Cell

Figure 2A:
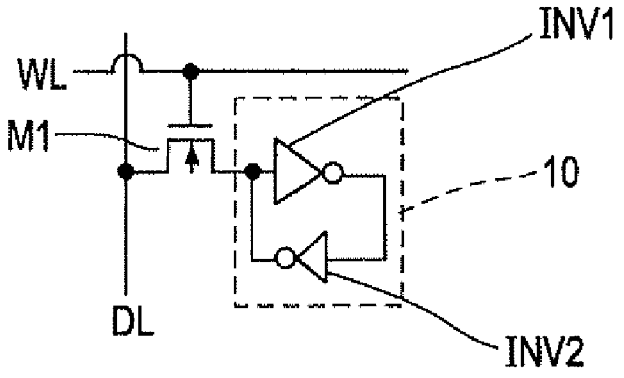
FIG. 2A, FIG. 2B and FIG. 2C are views, each of which shows an example of a circuit configuration of a memory circuit (memory cell) shown in FIG. 1.
Figure 2B:
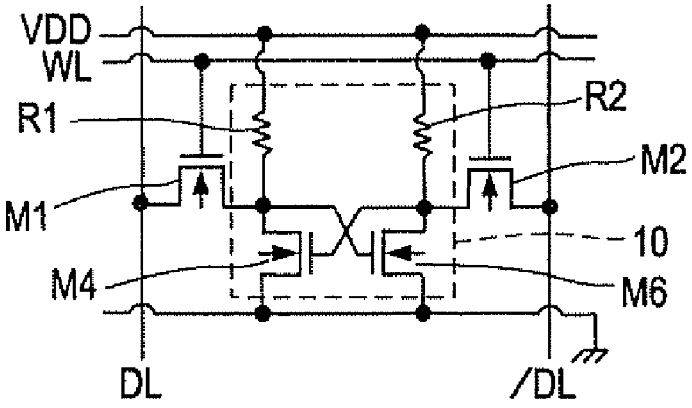
Figure 2C:
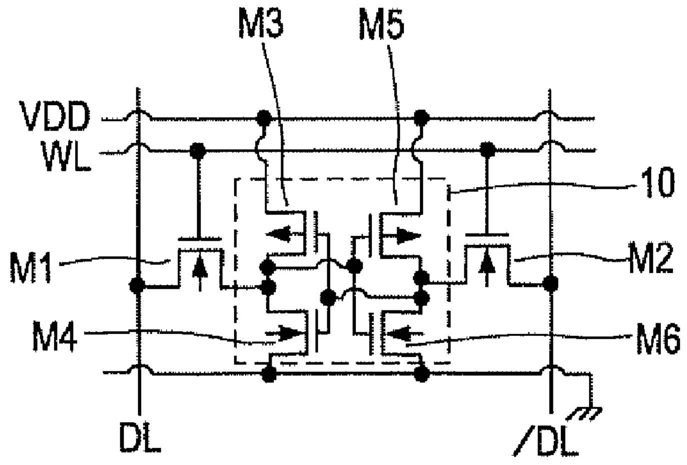

FIG. 2A to FIG. 2C are views, each of which shows an example of a circuit configuration of the memory circuit (memory cell) 10 shown in FIG. 1. Each memory circuit 10 is an SRAM (static random access memory) type memory cell.

In the memory cell (latch memory cell) shown in FIG. 2A, a flip-flop that holds a 1-bit data is formed of an inverter INV1 having a large driving capability and an inverter INV2 having a small driving capability.

The memory cell (high resistance memory cell) shown in FIG. 2B includes two transfer transistors (NMOS transistors that function as pixel selection transistors) ml and M2, NMOS transistors M4 and M6 that constitute a flip-flop, and load resistances R1 and R2. Two data lines (DL, /DL) that supply complementary signals are provided as data lines.

The memory cell shown in FIG. 2C is a full CMOS memory cell. The basic configuration of the memory cell shown in FIG. 2C is the same as that of the memory cell shown in FIG. 25. However, the load of the flip-flop is formed of PMOS transistors M3 and M5. Two data lines (DL, /DL) that supply complementary signals are provided as data lines.

Configuration of Pixel Circuit

Figure 3:
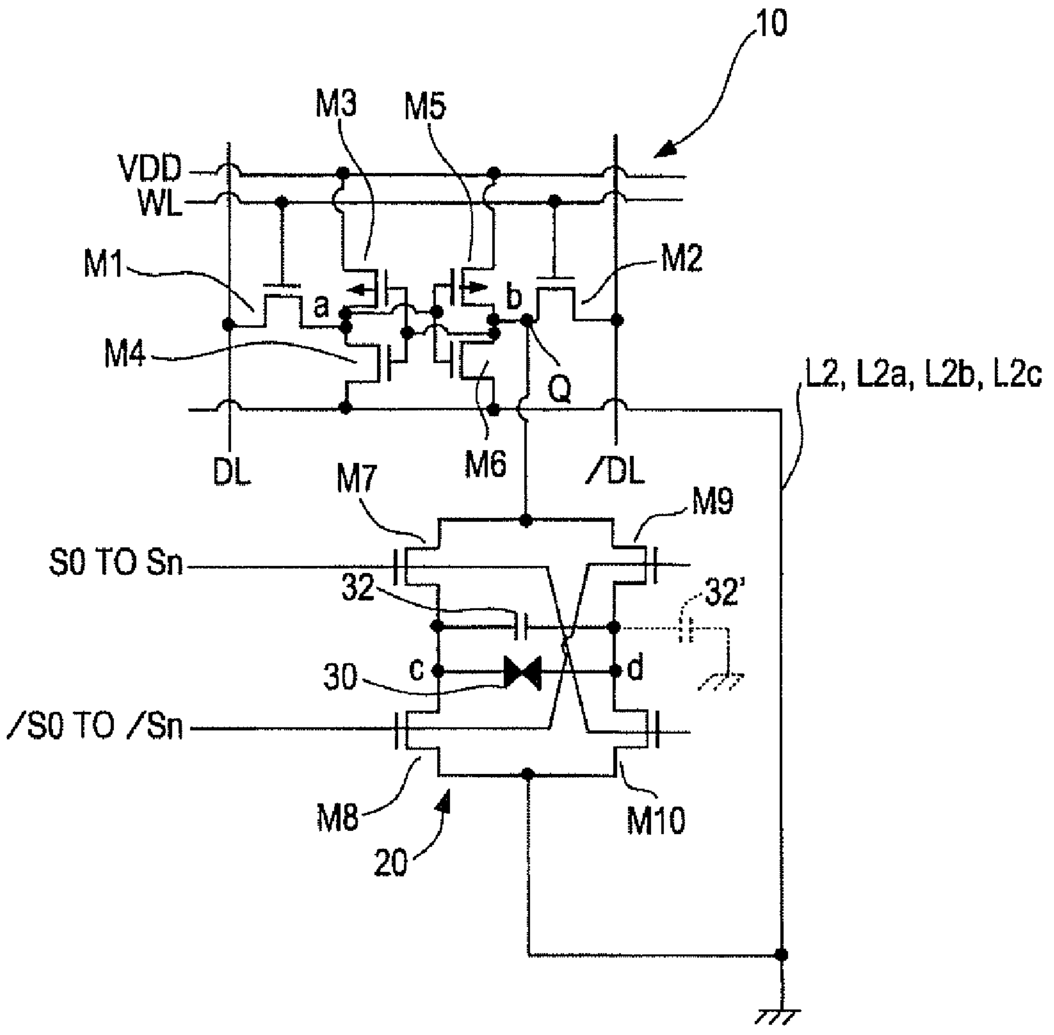
FIG. 3 is a circuit diagram that shows an example of a specific circuit configuration of a pixel circuit.

FIG. 3 is a circuit diagram that shows an example of a specific circuit configuration of the pixel circuit 50. In FIG. 3, the full CMOS memory cell, shown in FIG. 2C, is used as the memory circuit 10.

In addition, the voltage inverter circuit 20 includes NMOS transistors (M7, M8) and NMOS transistors (M9, M10). The NMOS transistors (M7, M8) are connected in series between the voltage supply end (Q) of the memory circuit 10 and the reference power supply electric potential (GND) and respectively serve as first and second switching elements. Similarly, the NMOS transistors (M9, M10) are connected in series between the voltage supply end (Q) of the memory circuit 10 and the reference power supply electric potential (GND) and respectively serve as third and fourth switching elements.

The first and second electrodes (denoted by the reference numerals 218*a*, 218*b* in FIG. 13) of the lateral electric field mode liquid crystal (IPS mode liquid crystal element) 30 and the holding capacitor 32 are connected to a common connecting point (c) of the NMOS transistors (M7, M8), which serve as the first and second switching elements, and a common connecting point (d) of the NMOS transistors (M9, M10), which serve as the third and fourth switching elements.

Then, each of the switch control signals (S0 to Sn) is input to the gates of the NMOS transistors (M7, M10), which serve as the first and fourth switching elements, and whether the NMOS transistors (M7, M10) simultaneously turn on or turn off is controlled by each of the switch control signals (S0 to Sn).

Similarly, each of the switch control signals (/S0 to /Sn), which are in opposite phase to the switch control signals S0 to Sn, is input to the gates of the NMOS transistors (M8, M9), which serve as the second and third switching elements, and whether the NMOS transistors (M8, M9) simultaneously turn on or turn off is controlled by each of the switch control signals (/S0 to /Sn).

That is, the NMOS transistors (M7, M8) are a set of transistors that are connected in series between the voltage supply end (Q) of the memory circuit 10 and the reference power supply electric potential (GND). Similarly, the third and fourth transistors (M9, M10) also are a set of transistors that are connected in series between the voltage supply end (Q) of the memory circuit 10 and the reference power supply electric potential (GND). Then, the sets of transistors (M7 and M8, M9 and M10) are connected in parallel with each other between the voltage supply end (Q) of the memory circuit 10 and the reference power supply electric potential (GND). The common connecting points (c, d) of the respective sets of two NMOS transistors are electrically connected to the first and second pixel electrodes (denoted by the reference numerals 218*a*, 218*b* in FIG. 13) of the liquid crystal element 30 and the holding capacitor 32.

Then, when one of the one set of transistors (here, the first NMOS transistor (M7)) turns on and supplies a voltage from the memory circuit 10 to one of the electrodes (218*a* in FIG. 13) of the liquid crystal element 30 and the holding capacitor 32, one of the other set of transistors (here, the fourth NMOS transistor M10) turns on and supplies the reference power supply electric potential (ground electric potential) to the other one of the electrodes (218*b* in FIG. 13) of the liquid crystal element 30 and the holding capacitor 32.

Similarly, when the other one of the other set of transistors (here, the third NMOS transistor (M9)) turns on and supplies a voltage from the memory circuit 10 to the one of the electrodes (218*a* in FIG. 13) of the liquid crystal element 30 and the holding capacitor 32, the other one of the one set of transistors (here, the second NMOS transistor M8) turns on and supplies the reference power supply electric potential (ground electric potential) to the other one of the electrodes (218*b* in FIG. 13) of the liquid crystal element 30 and the holding capacitor 32.

In addition, in a period when new data is written to the memory circuit 10, each of the switch control signals (S0 to Sn, /S0 to /Sn) that are input to the gates of the NMOS transistors (M7, M10), which serve as the first and fourth switching elements, and to the gate of the NMOS transistors (M8, M9), which serve as the second and third switching elements, are controlled to turn off these all NMOS transistors (M7, M8, M9, M10), and then the voltage of the display data held in the holding capacitor 32 is applied to the electrodes of the liquid crystal element 30. Thus, the preceding display data is displayed on the liquid crystal element 30. Then, at the time when writing of new data to the memory circuit 10 has been completed, in order to drive the voltage inverter circuit, as described above, the switch control signals (S0 to Sn, /S0 to /Sn) are generated as signals in opposite phase and are supplied to the gates of the NMOS transistors (M7, M10), which serve as the first and fourth switching elements, and to the gates of the NMOS transistors (M8, M9), which serve as the second and third switching elements.

In addition, as described above, the ground electric potential of the memory circuit 10 and the ground electric potential of the voltage inverter circuit 20 are supplied through the common ground line (L2 (specifically, L2*a*, L2*b*, L2*c*)). In this manner, when the ground electric potential is supplied to the electrodes (218*a*, 218*b*) of the liquid crystal element 30 and the holding capacitor 32, there is no relative difference in voltage level. Thus, a direct-current offset does not occur and, therefore, a burn-in phenomenon never occurs.

In addition, in the circuit shown in FIG. 3, the voltage supplied from the memory circuit 10 is directly applied to one end (source or drain) of each of the upper side NMOS transistors (M7, M9) that constitute the voltage inverter circuit 20. In general, the withstand voltage between the source and drain of a MOS transistor is higher than the withstand voltage between the gate and source thereof, so that there is no problem in withstand voltage.

In addition, in the case of the pixel circuit shown in FIG. 3, the memory circuit 10 is directly connected to the voltage inverter circuit 20. For example, as described in JP-A-2005-25048, the gate/source channel of the MOS transistor is not connected in a path to supply a voltage to the liquid crystal. Thus, the high level side power supply voltage (VDD) values of the memory circuit 10 and voltage inverter circuit 20 may be the same (that is, VDDs are all 5 V), so that the sizes of the MOS transistors (M1 to M10) that constitute the circuits (10, 20) may be the same. For example, it is not necessary to use a high withstand voltage transistor for the transistors (M1 to M5) that constitute the memory circuit 10.

In addition, the complementary switch control signals (S0 to Sn, /S0 to /Sn) that are used to drive the voltage inverter circuit are signals versatilely used for a digital circuit and are easily generated. Particularly, it is easy to acquire the complementary clock switch control signals (S0 to Sn, /S0 to /Sn) on the basis of a timing pulse used in digital gray-scale driving that uses PWM.

In addition, in the pixel circuit shown in FIG. 3, in terms of usability, it is desirable that the VDD (5 V) supplied from the memory circuit 10 becomes a high level side power supply voltage of the voltage inverter circuit 20 as it is, and the VDD (5 V) is directly supplied to one of the electrodes (218*a* in FIG. 13) of the liquid crystal element 30 and the holding capacitor 32. In order to achieve the above situation, it is necessary that a voltage drop does not occur between the source/drain of each of the NMOS transistors (M7, M9). For this purpose, it is only necessary to supply a gate voltage that is sufficiently able to turn on the first and third NMOS transistors (M7, M9).

Specifically, the gates of the first and third NMOS transistors (M7, M9) only need to be driven by each of the switch control signals (S0 to Sn or /S0 to /Sn) of voltage levels that are equal to or more than (5 V (VDD)+threshold voltage (Vth)). It is not so difficult to boost the switch control signals S0 to Sn or /S0 to /Sn to a voltage that exceeds the VDD. For example, it is easy to obtain the voltage by boosting the power supply voltage (VDD) using a bootstrap circuit, so that there is no problem for realizing the gate driving method of the above described NMOS transistors.

Here, the holding capacitor 32 may be connected between the common connecting point (c) of the NMOS transistors (M7, M8), which serve as the first and second switching elements, and the connecting point (d) of the NMOS transistors (M9, M10), which serve as the third and fourth switching elements, or the holding capacitor 32 may be configured so that one end of the holding capacitor 32 is connected to any one of the connecting point (c) of the NMOS transistors (M7, M8), which serve as the first and second switching elements, and the connecting point (d) of the NMOS transistors (M9, M10), which serve as the third and fourth switching elements, and the other end of the holding capacitor 32 is connected to a predetermined direct-current electric potential (in FIG. 3, a holding capacitor 32' of the above described connection configuration is shown by dotted line). In any one of the connection methods, the holding capacitor 32 is able to display the preceding display data continuously on the liquid crystal element 30 in such a manner that, in a period when new display data is written to the memory circuit 10 in the pixel circuit 50, the input of the voltage inverter circuit 20 is made to enter a floating state to turn off all the NMOS transistors (M7, M8, M9, M10), which serve as the switching elements and constitute the voltage inverter circuit 20, and the voltage of the display data held in the holding capacitor 32 is applied to the liquid crystal element 30.

Basic Operation of Voltage Inverter Circuit

Figure 4A:
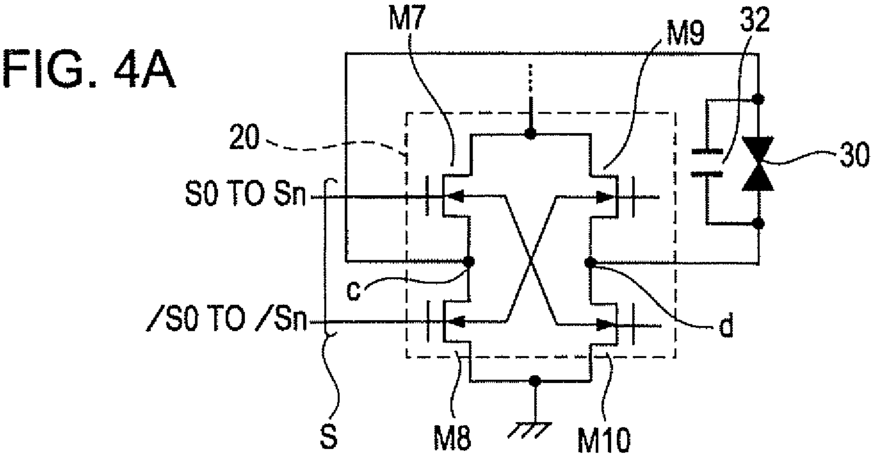
FIG. 4A, FIG. 4B and FIG. 4C are views, each of which illustrates polarity inversion operation of a voltage applied to a liquid crystal by a voltage inverter circuit.
Figure 4B:
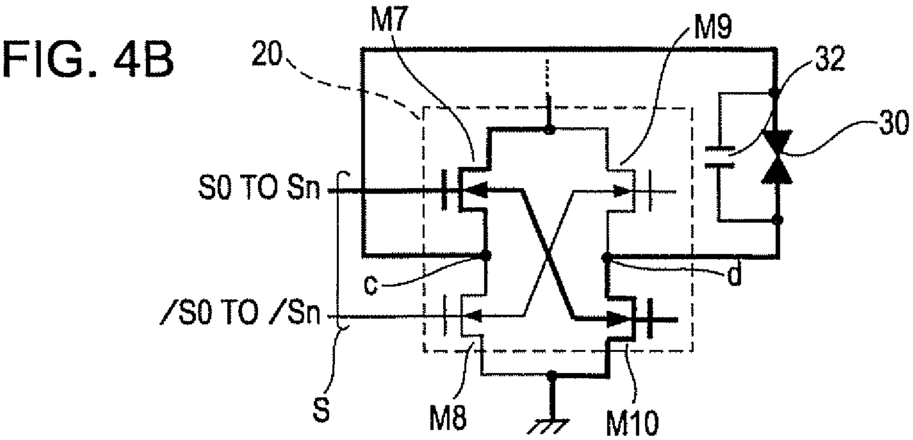
Figure 4C:
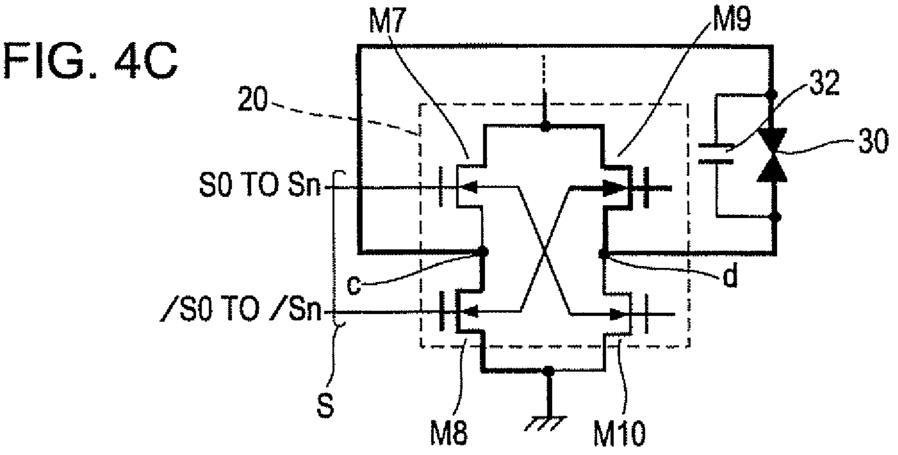

FIG. 4A to FIG. 4C are views, each of which illustrates polarity inversion operation of a voltage applied to the liquid crystal by the voltage inverter circuit.

FIG. 4A is a view that shows a state where the liquid crystal element 30 and the holding capacitor 32 connected in parallel with the liquid crystal element 30 are connected to the voltage inverter circuit 20. In FIG. 4B, the first and fourth NMOS transistors (M7, M10) turn on and a voltage is applied to both of the electrodes of the liquid crystal element 30 and the holding capacitor 32 along a path indicated by a wide line. In FIG. 4C, the second and third NMOS transistors (M8, M9) turn on and a voltage is applied to both of the electrodes of the liquid crystal element 30 and the holding capacitor 32 along a path indicated by a wide line.

In the state shown in FIG. 4B, the voltage supplied from the memory circuit 10 is applied to the upper side electrode of the liquid crystal element 30 and the upper side electrode of the holding capacitor 32, and the reference power supply electric potential (GND) is applied to the lower side electrode of the liquid crystal element 30 and the lower side electrode of the holding capacitor 32. In contrast, in the state shown in FIG. 4C, the voltage supplied from the memory circuit 10 is applied to the lower side electrode of the liquid crystal element 30 and the lower side electrode of the holding capacitor 32, and the reference power supply electric potential (GND) is applied to the upper side electrode of the liquid crystal element 30 and the upper side electrode of the holding capacitor 32. In this manner, by switching a path along which a voltage is applied, it is possible to quickly switch a voltage applied to the liquid crystal element 30 and the holding capacitor 32.

In addition, as is apparent from FIG. 4B and FIG. 4C, only the path along which a voltage is applied is switched, and the voltage source (source) of a voltage applied to the liquid crystal element 30 and the holding capacitor 32 is not changed. That is, the voltages applied to the liquid crystal element 30 and the holding capacitor 32 are a voltage supplied from the memory circuit 10 and the reference power supply electric potential (GND) of the voltage inverter circuit 20. This is common to the states shown in FIG. 4A and FIG. 4B. Thus, there is no variation in voltage value before and after polarity inversion, so that an accurate polarity inversion is ensured and such voltage inversion may be easily performed.

The circuit according to the present embodiment never requires such a complicated control that, as in the case of the existing art, the voltage (Vp) of the lower electrode and the voltage (Vcom) of the opposite electrode (common electrode) are separately controlled, the levels of both voltages are adjusted with high accuracy and then the timing to apply the voltages is adjusted.

Specific Operation of Memory Circuit and Voltage Inverter Circuit

Figure 5A:
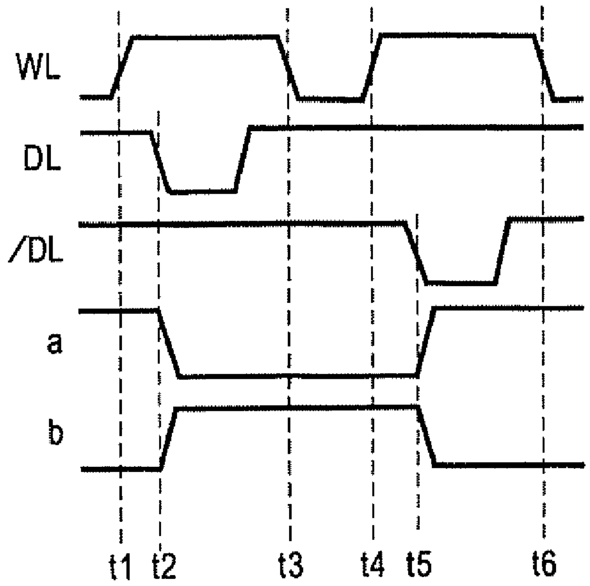
FIG. 5A is a timing chart that shows the operation of the memory circuit.
Figure 5B:
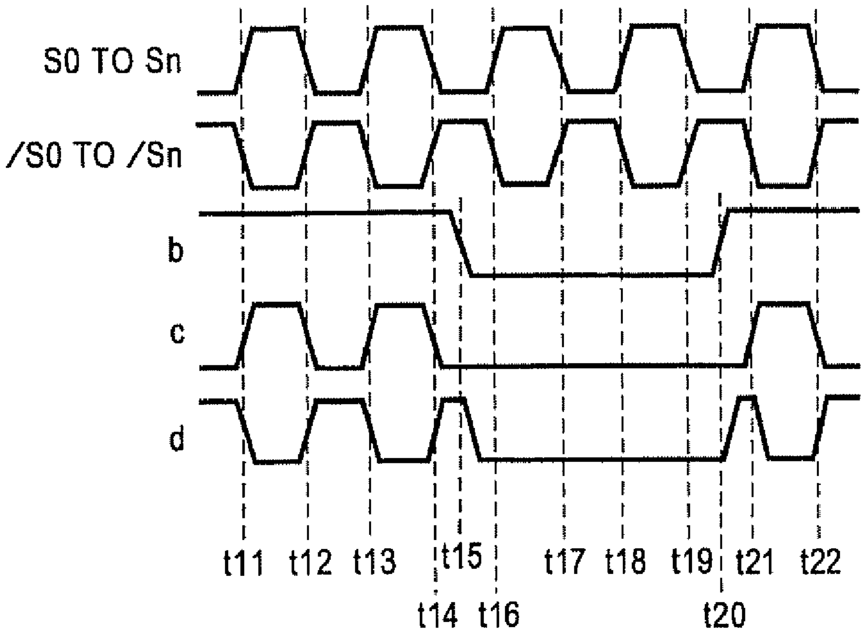
FIG. 5B is a timing chart that shows the operation of the voltage inverter circuit.

FIG. 5A and FIG. 5B are timing charts that indicate an operation timing of the pixel circuit shown in FIG. 3, FIG. 5A is a timing chart that shows the operation of the memory circuit, and FIG. 5B is a timing chart that shows the operation of the voltage inverter circuit.

First, the operation of the memory circuit 10 will be described with reference to FIG. 5A. At time t1, the scanning line WL changes from a low level to a high level, and, at time t2, the electric potential of the data line DL changes from a high level to a low level. In contrast, the voltage at a point (output point of SRAM) shown in FIG. 3 changes from a high level to a low level, and the voltage of b point (another output point of SRAM, which functions as the voltage supply end Q of the memory circuit) changes from a low level to a high level.

At time t3, the scanning line WL changes to a low level, and, after that, changes to a high level again at time t4. Thereafter, at time t5, the electric potential of the data line (/DL) changes from a high level to a low level. In contrast, the voltage at a point (output point of SRAM) shown in FIG. 3 changes from a low level to a high level, and the voltage at b point (another output point of SRAM, which functions as the voltage supply point Q of the memory circuit) changes from a high level to a low level.

Next, the operation of the voltage inverter circuit 20 will be described. As shown in FIG. 5B, the voltage levels of the complementary switch control signals (S0 to Sn, /S0 to /Sn) are periodically inverted. In a period when each of the switch control signals S0 to Sn is at a high level (t11 to t12, t13 to t14, t16 to t17, t18 to t19, t21 to t22), a voltage is applied to the liquid crystal element 30 and the holding capacitor 32 along a path indicated by the wide line in FIG. 4B. At this time, the electric potential at c point is equal to the electric potential at b point (that is, the voltage supply end Q of the memory circuit 10), and the electric potential at d point is equal to the reference power supply electric potential (ground electric potential: GND).

On the other hand, in a period when each of the switch control signals (/S0 to /Sn) is at a high level (t12 to t13, t14 to t16, t17 to t18, t19 to t21), a voltage is applied to the liquid crystal element 30 and the holding capacitor 32 along a path indicated by the wide line in FIG. 4C. At this time, the electric potential at d point is equal to the electric potential at b point (that is, the voltage supply end Q of the memory circuit 10), and the electric potential at c point is equal to the reference power supply electric potential (ground electric potential: GND).

Then, the electric potential at b point (that is, the voltage supply end Q of the memory circuit 10) changes from a high level to a low level at time t15 shown in FIG. 5B and changes from a low level to a high level at time t20. That is, this period is a period when new display data is written to the memory circuit 10 in order to update the display data. Thus, when no holding capacitor 32 is provided, in this period, the liquid crystal element 30 connected to each of the pixel circuits 50 is influenced because of writing of new display data to the memory circuit 10. Thus, it is impossible to stably display an image, and a flicker will occur on the screen. However, because the liquid crystal device according to the embodiment of the invention is provided with the holding capacitor 32, the voltage of the preceding display data is applied to the holding capacitor 32 until time t15. Thus, in the liquid crystal element 30, irrespective of writing of new display data to the memory circuit, the preceding data are continuously displayed on the liquid crystal element 30. That is, as shown in FIG. 1, in a period when new display data is written to the memory circuit, the switch control signals S0 to Sn, /S0 to /Sn that are complementarily generated in the other period are controlled to turn off the NMOS transistors (M7, M8, M9, M10, which serve as the switching elements in the voltage inverter circuit 20, and the voltage of display data held in the holding capacitor 32 is applied to the electrodes on both sides of the liquid crystal element 30. Thus, even in a period when new display data is being written in the memory circuit 10, until the time when writing of display data to all the memory circuits connected to one scanning line has been completed, the preceding display data is continuously displayed on the liquid crystal element, so that the update of the display data does not appear on the screen and, thereby, it is possible to prevent a flicker, or the like.

General Configuration of Liquid Crystal Device

Figure 6:
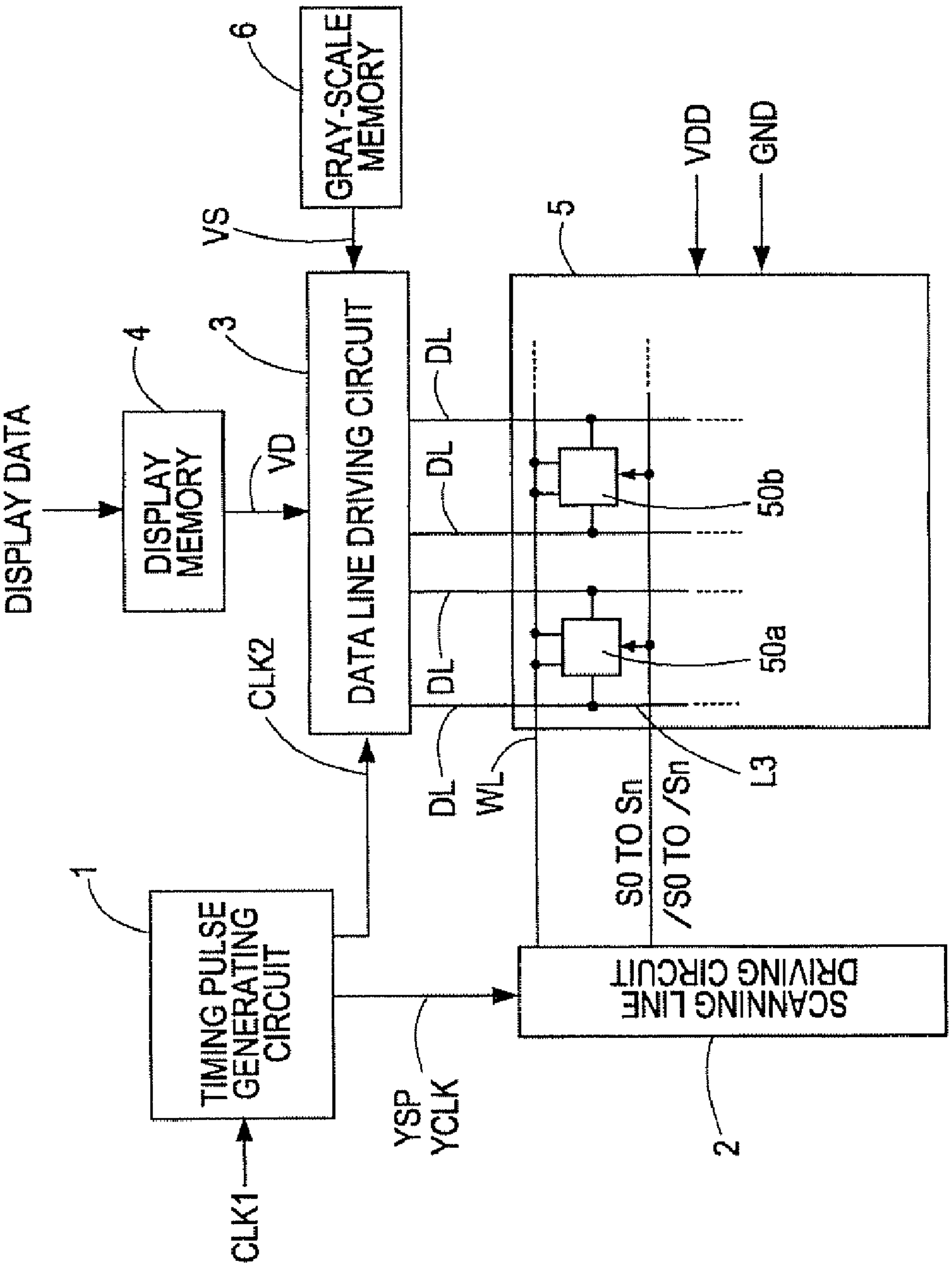
FIG. 6 is a block diagram that shows one example of a general configuration of the liquid crystal device according to the embodiment of the invention.

FIG. 6 is a block diagram that shows one example of a general configuration of the liquid crystal device according to the embodiment of the invention. In the liquid crystal device shown in FIG. 6, the digital gray-scale driving mode employs equal interval sub-field driving (which is a mode in which one field period is divided into sub-fields having equal intervals, and then turning on/off of the liquid crystal element 30 in each of the sub-fields is controlled) is employed (however, the driving mode is not limited to it).

The liquid crystal device shown in FIG. 6 performs gray-shade with 256 gray-scale levels by means of driving using PWM. The number of pixels is 1024×769. The number of pixels per line by which data can be transmitted at a time is 128. The display panel is driven on the basis of equal interval sub-field.

As shown in the drawing, the liquid crystal device includes a timing pulse generating circuit 1, a scanning line driving circuit 2, a data line driving circuit 3, a display memory 4, an image display area 5 that includes a plurality of pixel circuits (50*a*, 50*b*, . . . ), and a gray-scale memory 6.

The timing pulse generating circuit 1 generates a horizontal synchronizing signal, a vertical synchronizing signal, a sub-field timing pulse, a scanning line driving circuit start signal, a data line driving circuit start signal YSP, a Y clock signal YCLK, an X clock signal, clock timing pulses (CLK2, CLK3), and the like, on the basis of a basic clock pulse CLK1, and outputs them to the scanning line driving circuit 2 and the data line driving circuit 3.

The scanning line driving circuit 2 sequentially outputs a "H (high)" level signal to each of the scanning lines (WL) at a timing of the above described scanning line driving pulse. In addition, the scanning line driving circuit 2 also outputs the switch control signals (S0 to Sn, /S0 to /Sn) that will be supplied to the voltage inverter circuit 20 of each of the pixel circuits (50*a*, 50*b*, . . . ).

The display memory 4 is a memory that temporarily stores display data supplied from the outside. The display memory 4 includes the same numbers of storage slots as the number of pixels formed in the image display area 5. The display memory 4 temporarily stores display data of one field. The display data are, for example, 8-bit gray-scale data that indicate the gray-scale level of a display luminance and take the value of "0" to "255". For example, "0" indicates black color, and "255" indicates white color. Display data VD read from the display memory 4 are supplied to the data line driving circuit 3.

In addition, the gray-scale memory 6 is a memory that stores a sub-field number corresponding to display data in advance, and the sub-field number corresponding to each pieces of display data is stored in the gray-scale memory 6. Data VS read from the gray-scale memory 6 are supplied to the data line driving circuit 3.

The data line driving circuit 3 reads the display data VD from the display memory 4 for every scanning line, and converts the read display data VD into the sub-field number on the basis of the content of the above described gray-scale memory 6. Then, each of the pixels is driven on the basis of a signal of a scanning line driving system, a sub-field timing pulse and the above described sub-field number.

In regard to the complementary switch control signals (S0 to Sn, /S0 to /Sn) that will be supplied to the voltage inverter circuit 20 included in each of the pixel circuits (50*a*, 50*b*, . . . ), the control signals S, /S are generated on the basis of various timing pulses (CLK3) output from the timing pulse generating circuit 1 and, on the basis of the signals S, /S, the switch control signals S0 to Sn, /S0 to /Sn are generated. Thus, in the liquid crystal device shown in FIG. 6, a simple circuit needs to be provided to generate the control signals (S, /S, S0 to Sn, /S0 to /Sn) and, hence, it is possible to simplify the circuit configuration (system configuration).

Frame Sequential Driving in Writing Display Data

Figure 7:
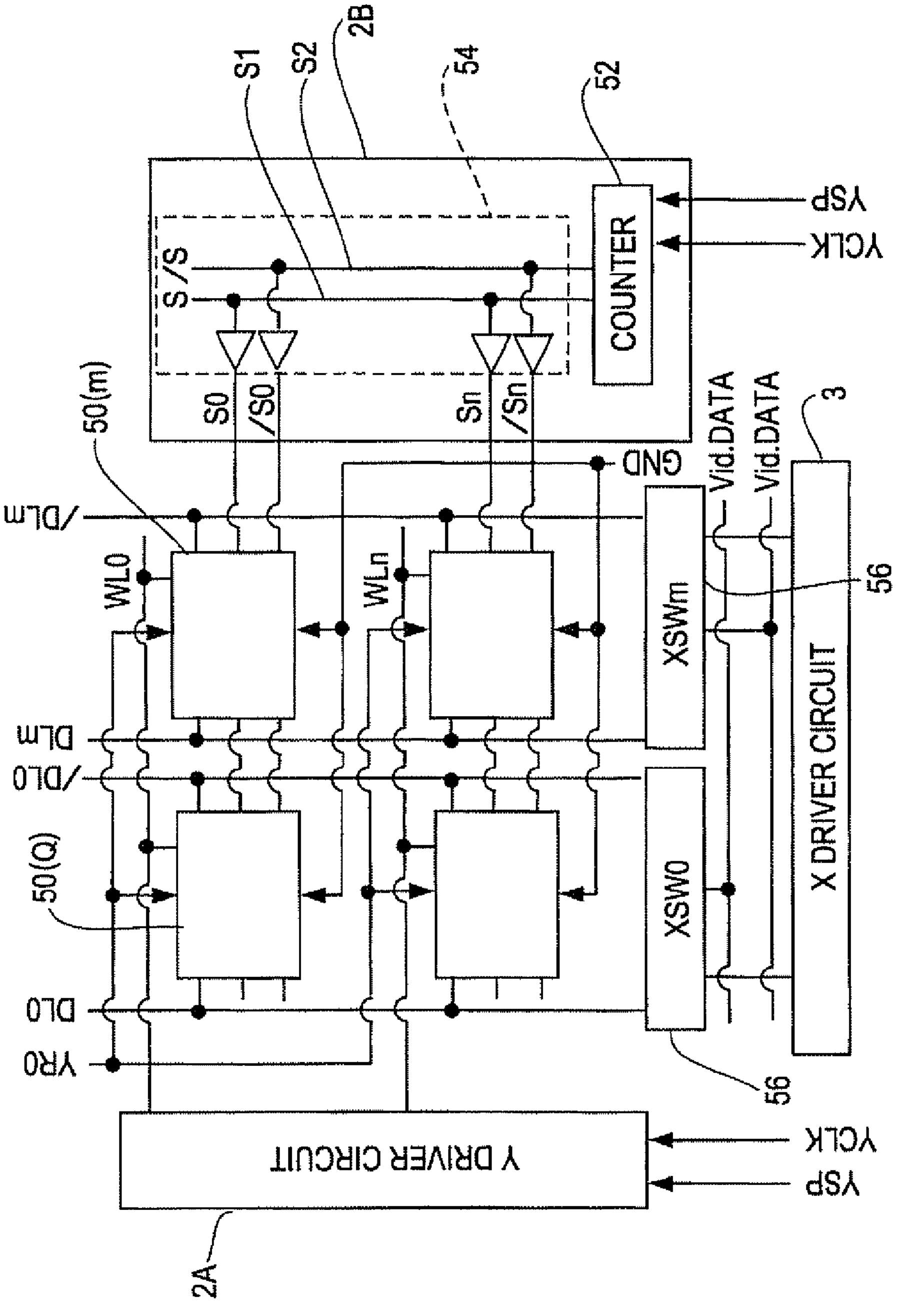
FIG. 7 is a block diagram that illustrates an operation in the liquid crystal device that performs frame sequential driving in writing display data according to the embodiment of the invention.

FIG. 7 is a block diagram that illustrates an operation in the liquid crystal device that performs frame sequential driving in writing display data according to the embodiment of the invention. As shown in the drawing, the liquid crystal device includes the scanning line driving circuit 2, the data line driving circuit 3, and an image display area 5 that includes the plurality of pixel circuits (50*a*, 50*b*, . . . ). Note that the description of the configuration of the liquid crystal device described with reference to FIG. 6 will be omitted. The scanning line driving circuit 2 is formed of a first scanning line driving circuit 2A and a second scanning line driving circuit 2B. The first scanning line driving circuit 2A sequentially outputs a "H (high)" level signal to the scanning lines (WL) at a timing of the scanning line drive start signal YSP. In addition, the second scanning line driving circuit 2B outputs the complementary switch control signals S0 to Sn, /S0 to /Sn that will be supplied to the voltage inverter circuit 20 included in each of the pixel circuits (50*a*, 50*b*, . . . ). That is, the second scanning line driving circuit 2B includes a sequential logic circuit, for example, a counter circuit 52, such as a shift register, and a driving circuit 54. The Y clock signal YCLK is input to the counter circuit 52 from a timing circuit shown in FIG. 6, and the output signals S, /S are output from the counter circuit 52 to the signal lines S, S2. The driving circuit 54 is connected to the signal lines S, S2 and provided for the scanning lines WL. The driving circuit 54 outputs the complementary switch control signals (S0 to Sn, /S0 to /Sn) that will be supplied to the voltage inverter circuit 20 in each of the pixel circuits (500 to 50*m*) connected to one scanning line on the basis of the output signals S, /S from the counter circuit 52. In the liquid crystal device according to the embodiment of the invention, in order to perform frame sequential driving in writing display data, all the scanning lines WL0 to WLn are sequentially selected, and, for each scanning line, the pixel circuits connected to the selected scanning line are selected so that the data lines are sequentially selected by the data line selection switch 56. Thus, display data are sequentially written to the pixel circuits connected to the one scanning line. At the time when writing of display data to all the pixel electrodes that constitute one screen has been completed, all pieces of display data are displayed on the liquid crystal elements. Hence, the display data for one frame are displayed.

Figure 8:
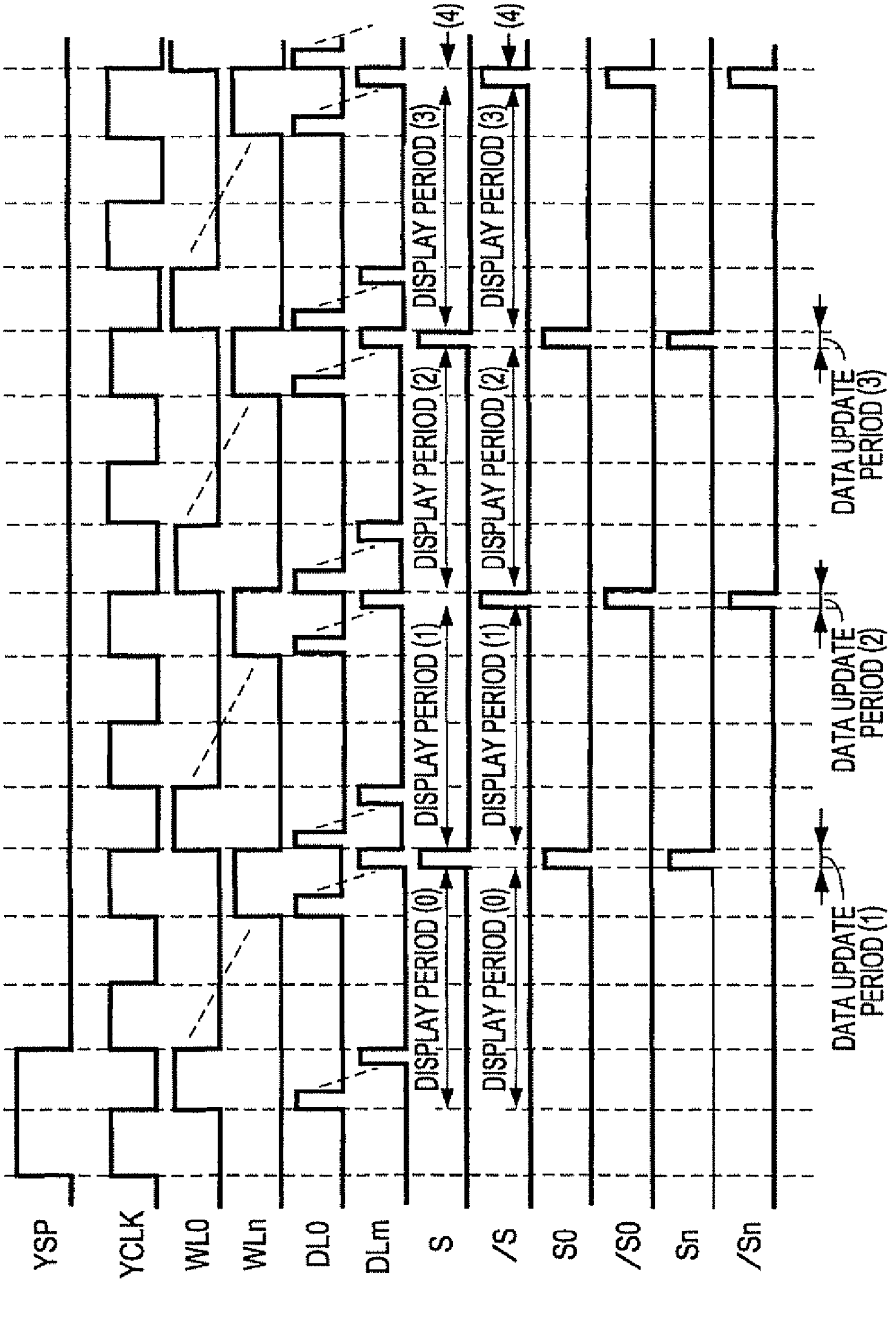
FIG. 8 is an operation timing chart of the liquid crystal device that performs frame sequential driving in writing display data according to the embodiment of the invention.

Next, writing of display data in the liquid crystal device, according to the embodiment of the invention, that performs frame sequential driving in writing display data will be described with reference to FIG. 8. FIG. 8 is an operation timing chart of the liquid crystal device that performs frame sequential driving in writing display data according to the embodiment of the invention.

The timing pulse generating circuit generates the scanning line driving circuit start signal YSP and the Y clock signal YCLK on the basis of the clock signal CLK1 input from the outside. The scanning line driving circuits 2A, 2B are started by the scanning line driving circuit start signal YSP, and the scanning line driving circuit 2A selects the scanning line WL0 on the basis of the Y clock signal YCLK. In a period when the scanning line WL0 is selected, all the data lines DL0 to DLm connected to the scanning line WL0 are sequentially selected, so that display data Vid.DATA1 are transmitted from the data line driving circuit to the pixel circuits 500 to 50*m* connected to the data lines DL0 to DLm. In this manner, the display data Vid.DATA1 are written to all the pixel circuits 50 connected to one scanning line WL0, and, subsequently, the display data Vid.DATA1 are written to all the pixel circuits 500 to 50*m* connected to the scanning line WL1. Similarly, the display data Vid.DATA1 are written to all the pixel circuits 50 connected to the scanning line WLn. Here, the scanning line driving circuit start signal YSP and the Y clock signal YCLK are also input from the timing pulse generating circuit to the scanning line driving circuit 2B, and, in the counter circuit 52, low level counter output signals S, /S are respectively output to the signal lines S1, S2. Then, the driving circuit 54, when receiving the low level counter output signals S, /S, outputs the low level switch control signals S0 to Sn, /S0 to /Sn to be supplied to all the pixel circuits 50.

In this display period (0), a voltage of the display data Vid.DATA0 that has been written before the display period (0) is supplied from the holding capacitor 32 to the liquid crystal element 30 connected to the voltage inverter circuit 20 and is continuously displayed on the liquid crystal element 30.

The period enters a data update period (1) in such a manner that a data line DLn is selected in the display period (0). The data update period (1) is short, and, when the counter output signal S changes to a high level, the switch control signals S0 to Sn become a high level. Thus, a high level signal is input to the gates of the NMOS transistors (M7, M10) shown in FIG. 3, so that the NMOS transistors (M7, M10) turn on. In the display period (0), the display data Vid.DATA1 written to the memory circuit 10 is displayed on the liquid crystal element 30, while the display data is updated by applying the voltage of the display data Vid.DATA1 to the holding capacitor 32. Then, as the display data has been updated, the counter output signal S becomes a low level and, in accordance with that, each of the switch control signals S0 to Sn also becomes a low level. Thus, the data update period (1) ends.

Next, the scanning line driving circuit 2A selects the scanning line WL0 on the basis of the Y clock signal YCLK. As the scanning line WL0 is selected, all the data lines DL0 to DLm connected to the scanning line WL0 are sequentially selected. Thus, the display data Vid.DATA2 are transmitted from the data line driving circuit to the pixel circuits 50 connected to these data lines DL0 to DLm. In this manner, the display data Vid.DATA2 are written to all the pixel circuits 50 connected to the one scanning line WL0, and, subsequently, the display data Vid.DATA2 are written to all the pixel circuits 50 connected to the scanning line WL1. Similarly, the display data Vid.DATA2 are written to all the pixel circuits 50 connected to the scanning line WLn. Here, the Y clock signal YCLK is also input from the timing pulse generating circuit to the scanning line driving circuit 2B, and, in the counter circuit 52, low level counter output signals S, /S are respectively output to the signal lines S1, S2. Then, the driving circuit 54, when receiving the low level counter output signals S, /S, outputs the low level switch control signals S0 to Sn, /S0 to /Sn to be supplied to all the pixel circuits 50.

In this display period (1), a voltage of the display data Vid.DATA1 that has been written to the pixel circuit 50 in the preceding display period (0) before the display period (1) is supplied from the holding capacitor 32 to the liquid crystal element 30 connected to the voltage inverter circuit 20 and is continuously displayed on the liquid crystal element 30.

The period enters a data update period (2) in such a manner that a data line DLn is selected in the display period (1). In the data update period (2), because the path in the voltage inverter circuit 20 is switched, when the counter output signal /S changes to a high level, the switch control signals /S0 to /Sn become a high level. Thus, a high level signal is input to the gates of the NMOS transistors (M8, M9) shown in FIG. 3, so that the NMOS transistors (M8, M9) turn on. In the screen display period (1), the display data Vid.DATA2 written to the memory circuit 10 is displayed on the liquid crystal element 30, while the display data is updated by applying the voltage of the display data Vid.DATA2 to the holding capacitor 32. Then, as the display data has been updated, the counter output signal /S becomes a low level and, in accordance with that, each of the switch control signals /S0 to /Sn also becomes a low level. Thus, the data update period (2) ends.

In this manner, the voltage of display data that will be updated in a data update period is not only supplied to the liquid crystal element 30 but also supplied to the holding capacitor 32 connected to the liquid crystal element 30, so that, in a period when new display data is written to the memory circuit 10 in the pixel circuit 50, the input of the voltage inverter circuit 20 is made to enter a floating state to thereby apply the voltage of the display data held in the holding capacitor 32 to the liquid crystal element 30. Thus, the preceding display data is displayed on the liquid crystal element 30. While the display data are being updated in the memory circuit 10, the process of updating display data does not appear on the screen and, hence, it is possible to prevent the occurrence of a flicker, or the like.

First Embodiment of Line Sequential Driving in Writing Display Data

Figure 9:
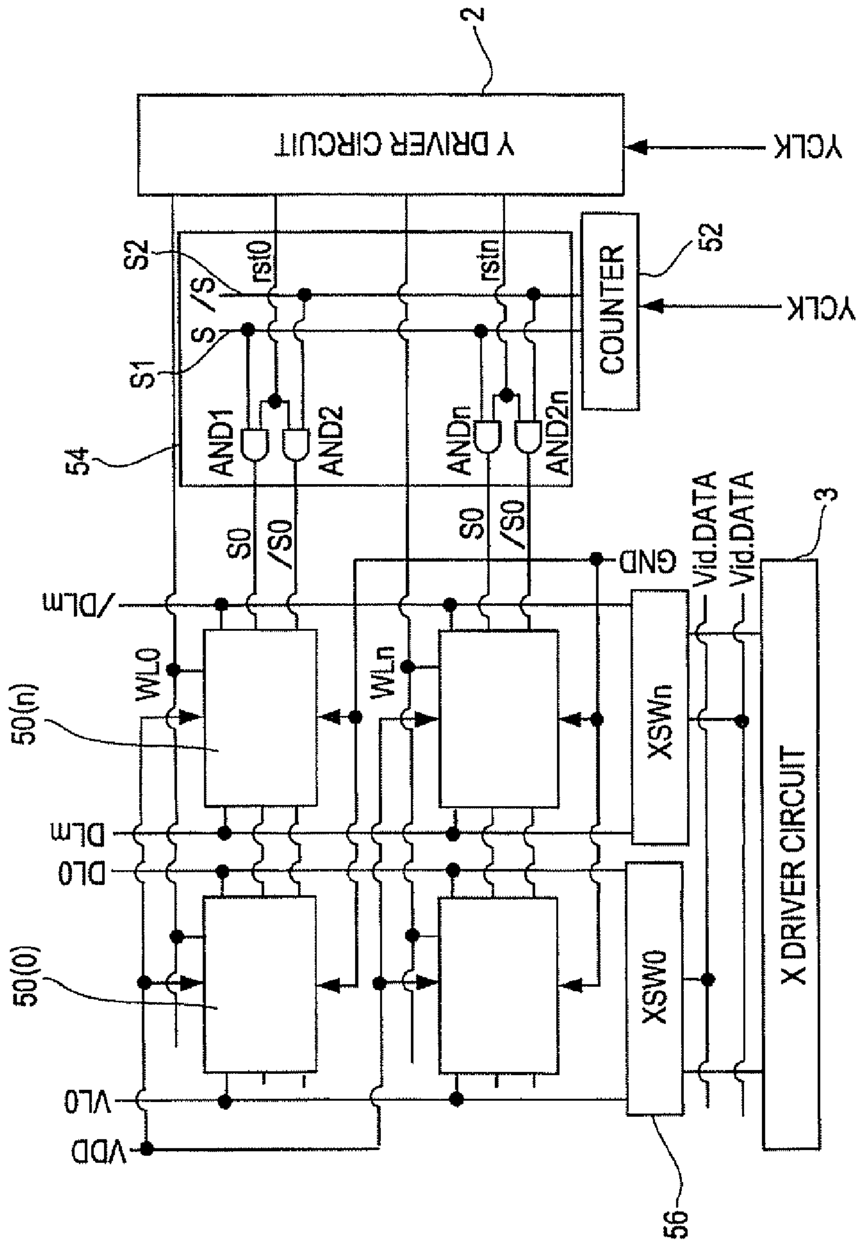
FIG. 9 is a block diagram that illustrates an operation in the liquid crystal device that performs line sequential driving in writing display data according to the embodiment of the invention.

FIG. 9 is a block diagram that illustrates an operation in the liquid crystal device that performs line sequential driving in writing display data according to the embodiment of the invention. As shown in the drawing, the liquid crystal device includes the scanning line driving circuit 2, the data line driving circuit 3, and the image display area 5 that includes the plurality of pixel circuits (500 to 50*m*). Note that the description of the configuration of the liquid crystal device described with reference to FIG. 6 will be omitted. The scanning line driving circuit 2 is driven by the scanning line driving circuit start signal YSP and sequentially outputs a "H (high)" level signal to the scanning lines (WL) at a timing of the Y clock signal YCLK. In addition, the scanning line driving circuit 2 outputs the switch control signals S0 to Sn, /S0 to /Sn that will be supplied to the voltage inverter circuit 20 included in each of the pixel circuits (500 to 50*m*). That is, the scanning line driving circuit 2 includes a sequential logic circuit, for example, the counter circuit 52, such as a shift register, and the driving circuit 54. The Y clock signal YCLK is input to the counter circuit 52 from the timing pulse generating circuit 1 shown in FIG. 6, and the output signals S, /S are output from the counter circuit 52 respectively to the signal lines S1, S2. The driving circuit 54 is connected to the signal lines S1, S2 and provided for the scanning lines. The driving circuit 54 inputs reset signals rst0 to rstn that will be supplied at output portions of the scanning line driving circuit at a predetermined timing (in a data update period). The driving circuit 54 is a logic circuit, for example, AND circuits AND1 to ANDn, AND2 to AND2*n*, that inputs output signals S, /S and reset signals rst0 to rstn from the counter circuit 52. The driving circuit 54 outputs the switch control signals (S0 to Sn, /S0 to /Sn) that will be supplied to the voltage inverter circuit 20 in each of the pixel circuits (500 to 50*m*) connected to one scanning line. In the liquid crystal device according to the embodiment of the invention, in order to perform line sequential driving in writing display data, one scanning line is selected, and the data line selection switches 56 are switched for the pixel circuits connected to the one scanning line to thereby sequentially write display data. At the time when the writing of new display data to all the pixel circuits connected to the one scanning line has been completed, new display data corresponding to the one scanning line are displayed on the liquid crystal elements. Similarly, the scanning lines WL2 to WLn are sequentially selected, and new display data are sequentially written to the pixel circuits 50 connected to the one scanning line. At the time when writing has been completed, the newly written display data are displayed on the liquid crystal elements. Thus, the display data for all the pixel circuits that constitute one screen are displayed on the liquid crystal elements.

Figure 10:
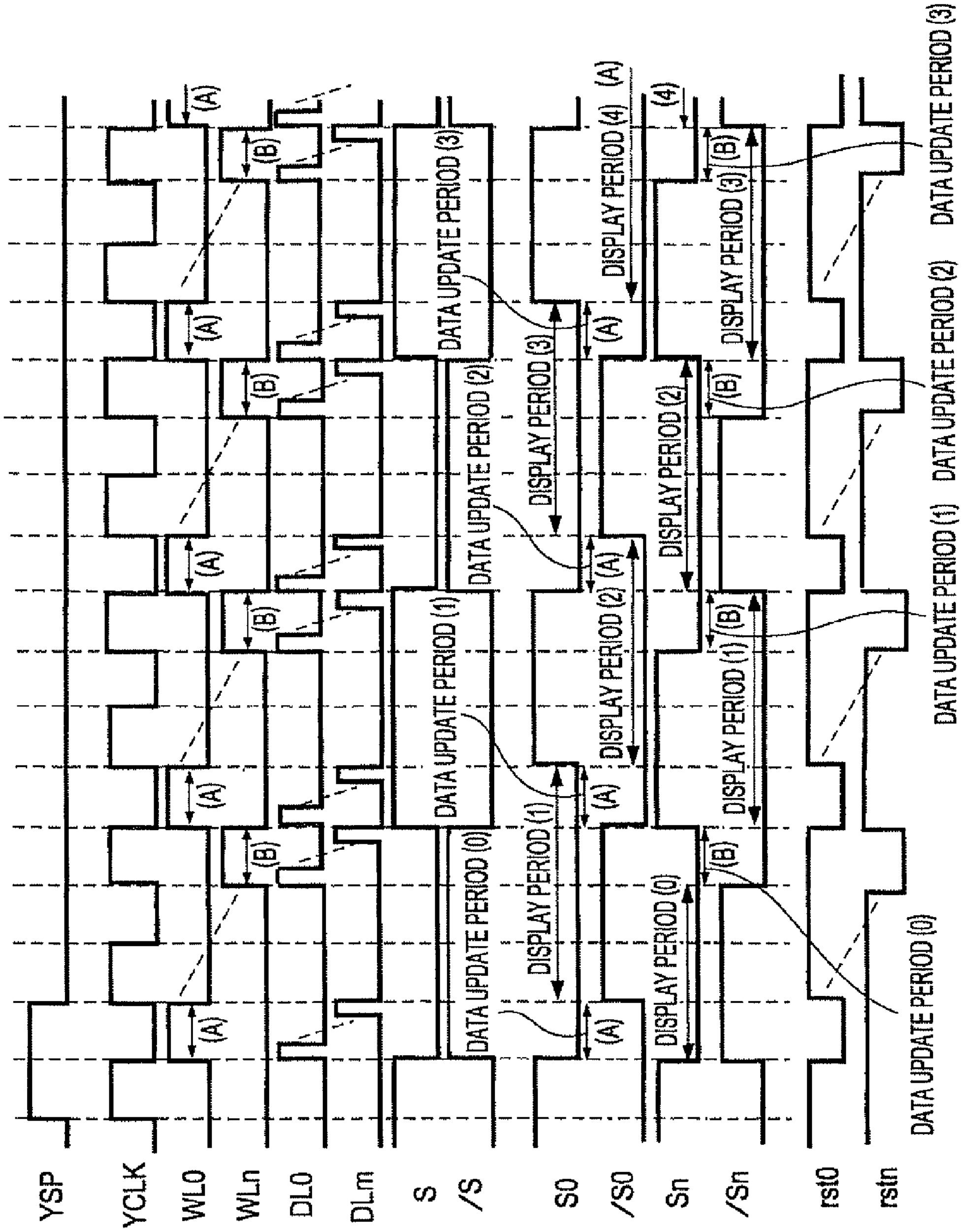
FIG. 10 is an operation timing chart of the liquid crystal device that performs line sequential driving in writing display data according to the embodiment of the invention.

Next, the operation of the liquid crystal device that performs line sequential driving in writing display data according to the embodiment of the invention will be described with reference to FIG. 10. FIG. 10 is an operation timing chart of the liquid crystal device that performs line sequential driving in writing display data according to the embodiment of the invention.

The timing pulse generating circuit 1 generates the scanning line driving circuit start signal YSP and the Y clock signal YCLK on the basis of the clock signal CLK1 input from the outside. The scanning line driving circuit 2 is started by the scanning line driving circuit start signal YSP, and the scanning line driving circuit 2 selects the scanning line WL0 on the basis of the Y clock signal YCLK.

As the scanning line WL0 is selected, all the data lines DL0 to DLm connected to the scanning line WL0 are sequentially selected. Thus, the display data Vid.DATA1 are transmitted from the data line driving circuit to the pixel circuits 50 connected to these data lines DL0 to DLm. In this manner, the display data Vid.DATA1 are written to all the pixel circuits 50 connected to the one scanning line WL0.

On the other hand, at this time, the Y clock signal YCLK is input from the timing pulse generating circuit 1, and a low level counter output signal S is output to the signal line S1 and a high level counter output signal /S is output to the signal line S2 in the counter circuit 52, while a low level reset signal rst0 is output from the scanning line driving circuit 2 in the data update period (1). Thus, a low level switch control signal S0 is output through an AND circuit AND1, and a low level switch control signal /S0 is output through an AND circuit AND2. Thus, because the input of the voltage inverter circuit 20 in the pixel circuit 50 shown in FIG. 3 is made to enter a floating state, in the data update period (1), a voltage of display data Vid.DATA0 that has been written in the preceding display period (0) before the display period (1) is supplied from the holding capacitor 32 to the liquid crystal element 30 connected to the voltage inverter circuit 20 and continuously displayed on the liquid crystal element 30. Then, as the reset signal rst0 is set to a high level, S0, which is an output of the AND circuit AND1, becomes a low level, and /S0, which is an output of the AND circuit AND2, becomes a high level. Then, the gates of the NMOS transistors (M8, M9) shown in FIG. 3 are supplied with a high level signal /S0 and thereby the NMOS transistors (M8, M9) turn on. Because of this, the display data VinDATA1 is displayed on the liquid crystal element 30, and a voltage of the display data VinDATA1 is held in the holding capacitor 32.

Similarly, the display data Vid.DATA1 are written to the pixel circuits 50 connected to the scanning lines WL1 to WLn. In the data update period (1) when the scanning line WLn is selected, a low level reset signal rstn is supplied, and the switch control signals Sn and /Sn corresponding to the selected scanning line both are set to a low level. Thus, because the input of the voltage inverter circuit 20 in the pixel circuit 50 shown in FIG. 3 is made to enter a floating state, in the data update period (1), a voltage of display data Vid.DATA0 that has been written in the preceding display period (0) before the display period (1) is supplied from the holding capacitor 32 to the liquid crystal element 30 connected to the voltage inverter circuit 20 and continuously displayed on the liquid crystal element 30. Then, as the reset signal rstn is set to a high level, Sn, which is an output of the AND circuit AND1, becomes a low level, and /Sn, which is an output of the AND circuit AND2, becomes a high level. Then, the gates of the NMOS transistors (M8, M9) shown in FIG. 3 are supplied with a high level signal /Sn and thereby the NMOS transistors (M8, M9) turn on. Because of this, the display data VinDATA1 is displayed on the liquid crystal element 30, and a voltage of the display data VinDATA1 is held in the holding capacitor 32. In this manner, the display data Vid.DATA1 are written to all the pixel circuits 50 connected to the scanning lines WL1 to WLn. Thus, writing of the display data for one frame ends.

Similarly, In regard to writing of display data for the second frame as well, the timing pulse generating circuit 1 generates the scanning line driving circuit start signal YSP and the Y clock signal YCLK on the basis of the clock signal CLK1 input from the outside. The scanning line driving circuits 2 is started by the scanning line driving circuit start signal YSP, and the scanning line driving circuit 2 selects the scanning line WL0 on the basis of the Y clock signal YCLK. As the scanning line WL0 is selected, all the data lines DL0 to DLm connected to the scanning line WL0 are sequentially selected. Thus, the display data Vid.DATA2 are transmitted from the data line driving circuit to the pixel circuits 50 connected to these data lines DL0 to DLm. In this manner, the display data Vid.DATA2 are written to all the pixel circuits 50 connected to one scanning line WL0.

On the other hand, at this time, the Y clock signal YCLK is input from the timing pulse generating circuit 1, and a high level counter output signal S is output to the signal line S1 and a low level counter output signal /S is output to the signal line S2 in the counter circuit 52, while a low level reset signal rst0 is output from the scanning line driving circuit 2 in the data update period (2). Thus, a low level switch control signal S0 is output through the AND circuit AND1, and a low level switch control signal /S0 is output through the AND circuit AND2. Thus, because the input of the voltage inverter circuit 20 in the pixel circuit 50 shown in FIG. 3 is made to enter a floating state, in the data update period (2), a voltage of display data Vid.DATA1 that is written in the preceding display period (1) before the display period (2) is supplied from the holding capacitor 32 to the liquid crystal element 30 connected to the voltage inverter circuit 20 and continuously displayed on the liquid crystal element 30. Then, as the reset signal rst0 is set to a high level and the data update period (2) ends, S0, which is an output of the AND circuit AND1, becomes a high level, and /S0, which is an output of the AND circuit AND2, becomes a low level. Then, the gates of the NMOS transistors (M7, M10) shown in FIG. 3 are supplied with a high level signal /S0 and thereby the NMOS transistors (M7, M10) turn on. Because of this, the display data VinDATA2 is displayed on the liquid crystal element 30, and a voltage of the display data VinDATA2 is held in the holding capacitor 32.

Similarly, the display data Vid.DATA2 are written to the pixel circuits 50 connected to the scanning lines WL1 to WLn. In the data update period (2) when the scanning line WLn is selected, a low level reset signal rstn is supplied, and the switch control signals Sn and /Sn corresponding to the selected scanning line both are set to a low level. Thus, because the input of the voltage inverter circuit 20 in the pixel circuit 50 shown in FIG. 3 is made to enter a floating state, in the data update period (2), a voltage of display data Vid.DATA1 that has been written in the preceding display period (1) before the display period (2) is supplied from the holding capacitor 32 to the liquid crystal element 30 connected to the voltage inverter circuit 20 and continuously displayed on the liquid crystal element 30. Then, as the reset signal rstn is set to a high level, Sn, which is an output of the AND circuit AND1, becomes a high level, and /Sn, which is an output of the AND circuit AND2, becomes a low level. Then, the gates of the NMOS transistors (M7, M10) shown in FIG. 3 are supplied with a high level signal Sn and thereby the NMOS transistors (M7, M10) turn on. Because of this, the display data VinDATA2 is displayed on the liquid crystal element 30, and a voltage of the display data VinDATA2 is held in the holding capacitor 32.

In this manner, the display data Vid.DATA2 are written to all the pixel circuits 50 connected to the scanning lines WL1 to WLn. Thus, writing of the display data for the second frame ends.

In this manner, in a period when data are written to the pixel circuits connected to one scanning line, a voltage of display data is not only supplied to the liquid crystal element but also supplied to the holding capacitor connected to the liquid crystal element. Thus, in a period when the next display data is written to the memory circuit in the pixel circuit, the input of the voltage inverter circuit is made to enter a floating state to thereby continuously display the preceding display data held in the holding capacitor on the liquid crystal element. Accordingly, while display data is being written in the memory circuit, the memory circuit is electrically isolated from the liquid crystal element and the holding capacitor to thereby not influence the data writing operation on the screen. Hence, it is possible to prevent the occurrence of a flicker, or the like.

Second Embodiment of Line Sequential Driving in Writing Display Data

Figure 11:
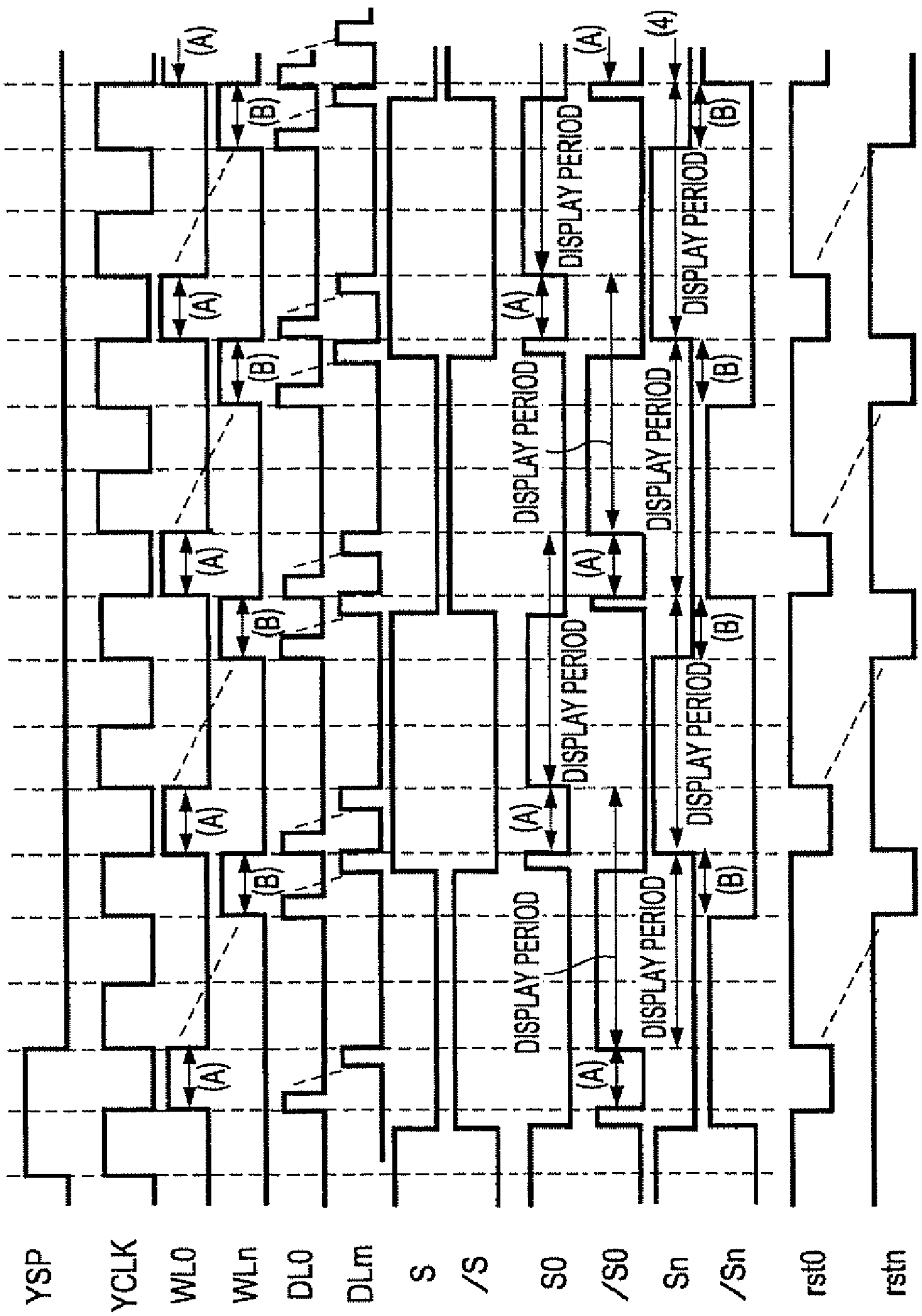
FIG. 11 is another operation timing chart of the liquid crystal device that performs line sequential driving in writing display data according to the embodiment of the invention.

FIG. 11 is another operation timing chart in regard to the writing operation of display data and the update of display data in the liquid crystal device that performs line sequential driving in writing display data according to the embodiment of the invention. In the present embodiment, the waveforms of the switch control signals S0, /S0 are different from those shown of FIG. 10.

That is, in the liquid crystal device that performs line sequential driving in writing display data according to the embodiment of the invention, when the reset signals rst0 to rstn are supplied in a period when data are sequentially written to the pixel circuits connected to one of the scanning lines WL0 to WLn, in a period when the next display data is written to the memory circuit in the pixel circuit, the input of the voltage inverter circuit is made to enter a floating state by means of a control using the reset signals rst0 to rstn to thereby continuously display the preceding display data held in the holding capacitor on the liquid crystal element. Therefore, the electric potential levels of the switch control signals S0, /S0 in the other period are regardless. Accordingly, it is also possible to obtain the equivalent advantageous effects as those of the first embodiment of line sequential driving in writing display data.

Device Structure of Lateral Electric Field Mode Liquid Crystal Element

Figure 12:
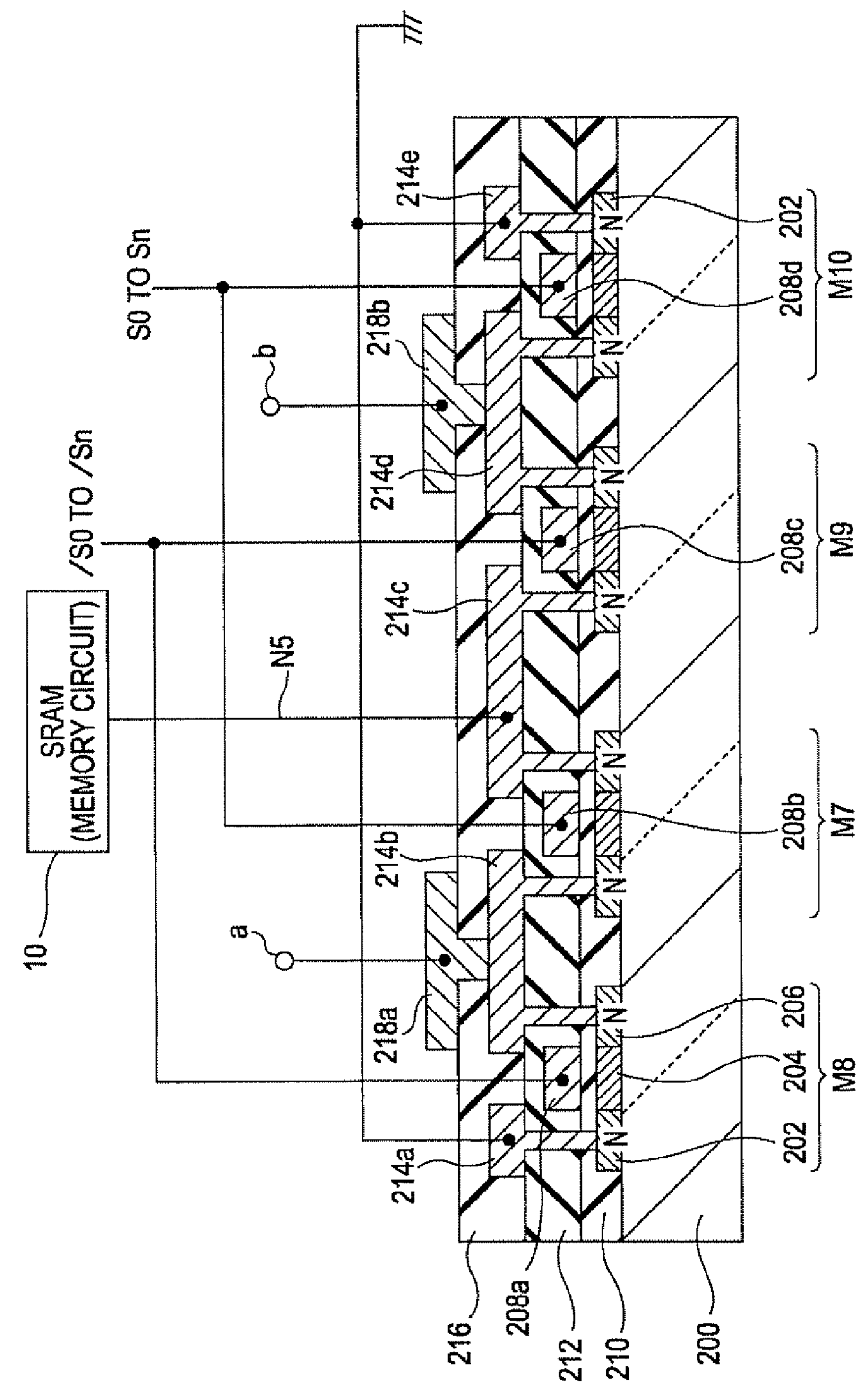
FIG. 12 is a view that shows a cross-sectional structure of a relevant part of an active matrix substrate according to the embodiment of the invention.

FIG. 12 is a view that shows a cross-sectional structure of a relevant part of an active matrix substrate according to the embodiment of the invention. In FIG. 12, the cross-sectional structure of four transistors (M8 to M10) that constitute the voltage inverter circuit 20 integrated on an array substrate 200 is mainly shown. However, the memory circuit (SRAM) 10 is also formed on the array substrate 200. Note that a light shielding film and an alignment layer are not shown in FIG. 12.

As shown in FIG. 12, a patterned polycrystal silicon layer 204 is formed on the array substrate 200, and source/drains (202, 206) are formed by selectively injecting impurities into the polycrystal silicon layer 204. A gate insulating film 210 is formed to embed therein the polycrystal silicon layer 204, and gate electrodes (208*a* to 208*d*) formed of polycrystal silicon are formed on the gate insulating film 210.

The gate electrodes (208*b*, 208*d*) are supplied with a corresponding one of the switch control signals (S0 to Sn), and the gate electrodes (208*a*, 208*c*) are supplied with a corresponding one of the switch control signals (/S0 to /Sn).

A first interlayer insulating film (212) is formed on the gate electrodes (208*a* to 208*d*), and contact holes are selectively formed in the first interlayer insulating film (212). Electrodes (214*a* to 214*e*) formed of a conductive material (metal material, such as aluminum) that reflects light are connected through the contact holes to the source/drains (202, 206).

The electrodes (214*a*, 214*e*) are applied with the ground electric potential (GND) as the reference power supply electric potential (reference power supply electric potential). In addition, the memory circuit (SRAM) 10 is connected to the electrode 214*c*. The binary voltage (first or second voltage: VDD or GND) is supplied from the memory circuit (SRAM) 10 through a line N5.

A second interlayer insulating film 216 is formed on the electrodes (214*a* to 214*e*), and contact holes are selectively provided in the second interlayer insulating film 216. First and second pixel electrodes (218*a*, 218*b*) are respectively connected through the contact holes to the electrodes (214*b*, 214*d*) located on the lower side. The first and second pixel electrodes (218*a*, 218*b*) correspond to the c point and d point shown in FIG. 3, and, owing to the first and second electrodes (218*a*, 218*b*), the liquid crystal element 30 and the holding capacitor 32 are applied with a voltage.

Figure 13:
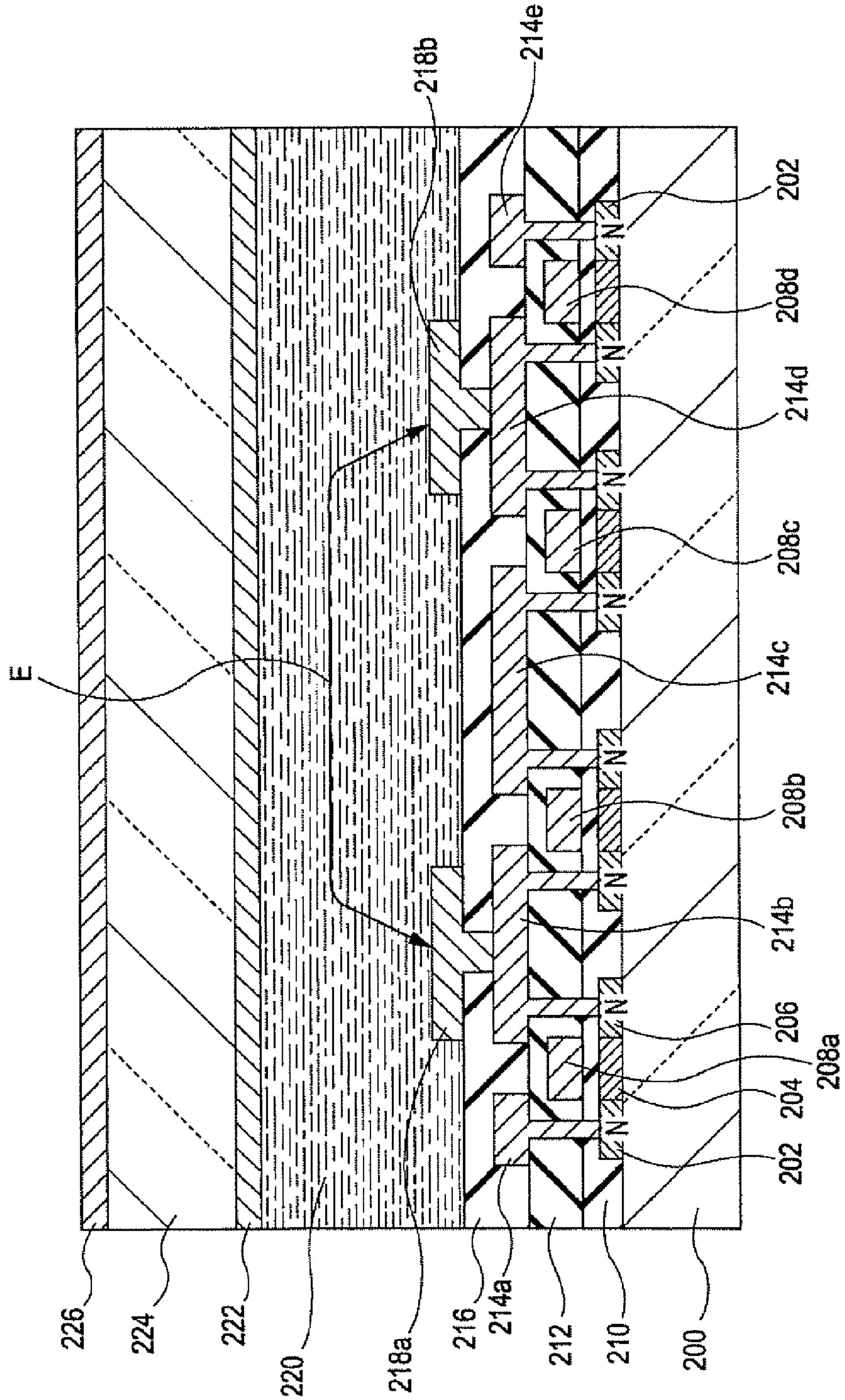
FIG. 13 is a cross-sectional view of the cross-sectional structure of the liquid crystal device (lateral electric field mode liquid crystal device) that uses the active matrix substrate shown in FIG. 12.

FIG. 13 is a cross-sectional view of the cross-sectional structure of the liquid crystal device (lateral electric field mode liquid crystal device) that uses the active matrix substrate shown in FIG. 12. As shown in the drawing, a liquid crystal layer 220 is held between the active matrix substrate shown in FIG. 12 and an opposite substrate 224. The reference numeral 222 represents a color filter layer, and the reference numeral 226 represents a polarizer.

An electric field E is applied horizontally to the liquid crystal layer 220 along the substrate plane, as indicated by the arrow in the drawing. Liquid crystal molecules rotate while maintaining the parallel orientation to the substrate plane. Thus, the light transmittance ratio of the liquid crystal layer 220 changes. In the lateral electric field mode liquid crystal device (IPS mode liquid crystal device) shown in FIG. 13, two pixel electrodes (218*a*, 218*b*) are provided in proximity to the array substrate 200, which makes it easy to extend an electrode, and, in addition, the common electrode (LCcom) is not used, so that a load capacity is small (only a liquid capacity corresponding to one pixel becomes a load) and, as a result, the voltages of both the pixel electrodes (218*a*, 218*b*) quickly change. Thus, it is possible to quickly perform an inversion operation of a voltage applied to the liquid crystal for preventing the occurrence of burn-in, and this contributes to a reduction of flicker.

Third Embodiment

In the present embodiment, the circuit configuration that suppresses a feedthrough current (Ipeak) in the voltage inverter circuit 20 will be described.

Figure 14A:
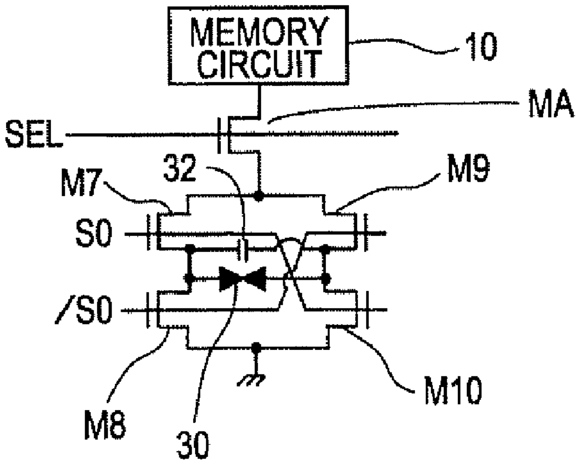
FIG. 14A, FIG. 14B and FIG. 14C are views, each of which illustrates a circuit configuration and the operation of a voltage inverter circuit according to an alternative embodiment.
Figure 14B:
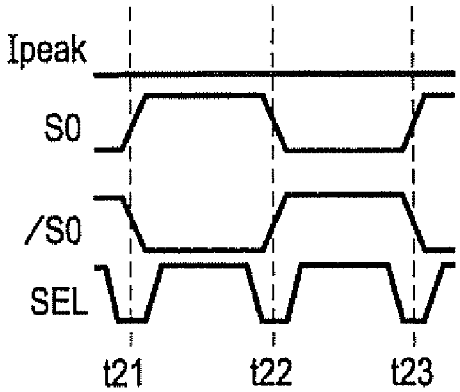
Figure 14C:
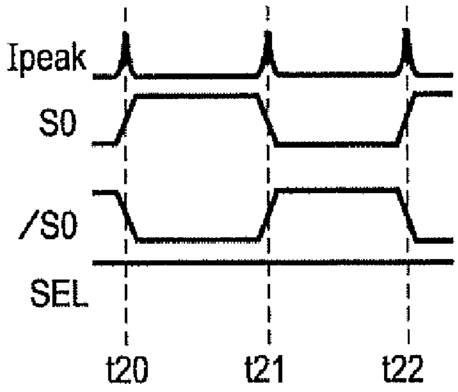

FIG. 14A to FIG. 14C are views, each of which illustrates the circuit configuration and operation of a voltage inverter circuit that has a device to suppress a feedthrough current (Ipeak). FIG. 14A is a circuit diagram that shows the circuit configuration. FIG. 14B is a timing chart that shows the operation of the circuit shown in FIG. 14A. FIG. 14C is a timing chart that shows the operation of a circuit that does not have a device to suppress a feedthrough current according to a comparative embodiment. In FIG. 14A to FIG. 14C, the same reference numerals are assigned to the same components as those shown in the above described drawings.

The voltage inverter circuit 20 shown in FIG. 3 has such a configuration that two MOS transistors (M7 and M8, or M9 and M10) are connected in series between the voltage supply end (Q) of the memory circuit 20 and the reference power supply electric potential. The two MOS transistors complementarily turn on/off. The MOS transistors turn on at the same time on the way the on/off of the MOS transistors are switched. At this time, a feedthrough current will definitely occur. This feedthrough current fluctuates the reference power supply electric potential (GND), and this may adversely affect the circuit operation.

That is, as shown in FIG. 14C, at a timing when the voltage levels of the complementary switch control signals (S0 to Sn, /S0 to /Sn) change (at time t20, t21, or t22), two MOS transistors (M7 and M8, M9 and M10) turn on at the same time and, therefore, a feedthrough current (Ipeak) occurs.

Then, in the circuit shown in FIG. 14A, a feedthrough current preventing transistor (switching element: MA) is provided between the memory circuit 10 and the MOS transistors (M7 and M8, M9 and M10), which are connected in series, and the on/off of the feedthrough current preventing transistor (MA) is controlled by a timing signal (SEL). In the circuit described in FIG. 14A to FIG. 14C, the feedthrough current preventing transistor (MA) is an NMOS transistor.

When the feedthrough current preventing transistor (MA) is turned off at a timing when a feedthrough current may occur (that is, at a timing when the voltage levels of the complementary switch control signals (S0 to Sn, /S0 to /Sn) change), the supply of a voltage (electric current) from the memory circuit 10 is stopped and, therefore, it reliably prevents the feedthrough current (Ipeak) from flowing.

That is, as shown in FIG. 14B, the timing signal (SEL) that turns off the feedthrough current preventing transistor (MA) becomes a low level at a timing when the voltage levels of the complementary switch control signals (S0 to Sn, /S0 to /Sn) change (at time t21, t22, or t23). Thus, the feedthrough current preventing transistor (MA) turns off and, thereby, the supply of a voltage (electric current) from the memory circuit 10 to the four transistors (M7 to M10) are interrupted. Accordingly, it reliably prevents the feedthrough current (Ipeak) from flowing.

Fourth Embodiment

Next, an electronic apparatus that includes the liquid crystal device (reflective liquid crystal device that has an SRAM and that uses a lateral electric field mode liquid crystal) according to the embodiment of the invention will be described.

Mobile Terminal Provided with Sub-panel

Figure 15:
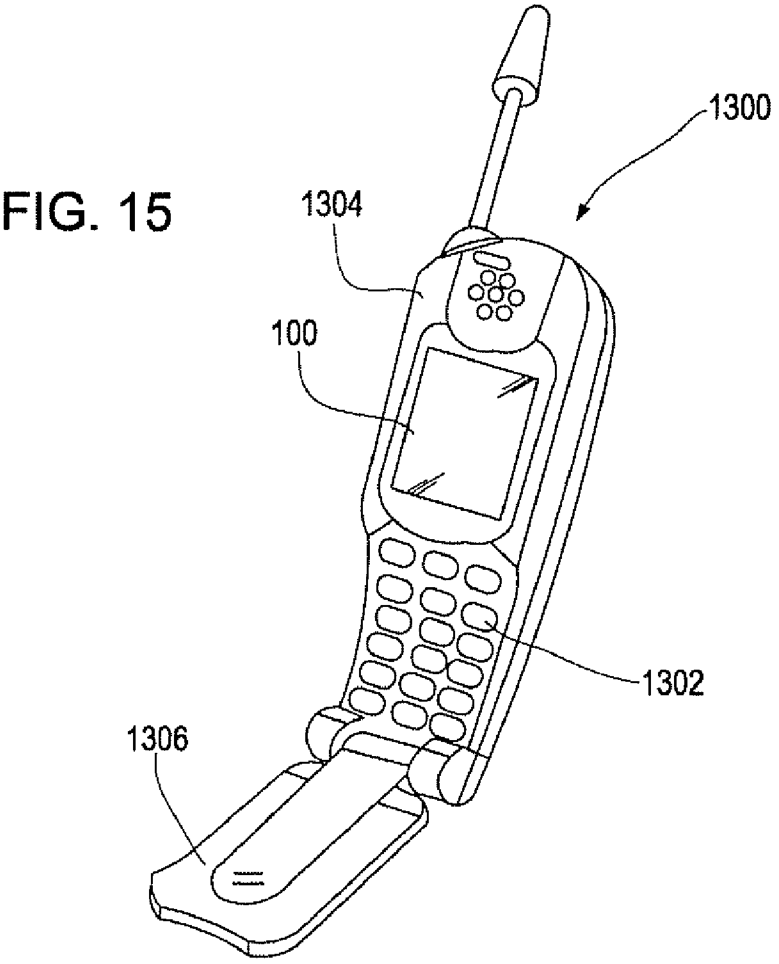
FIG. 15 is a perspective view of a mobile terminal (including a cellular phone, a PDA terminal, and a mobile personal computer) that is provided with a sub-panel.

FIG. 15 is a perspective view of a mobile terminal (including a cellular phone, a PDA terminal, and a mobile personal computer) that is provided with a sub-panel. The mobile terminal 1300 shown in FIG. 15 is a cellular phone terminal and, as shown in the drawing, includes an upper case 1304, a sub-panel 100 provided on the inner surface of the upper case 1304, a lower case 1306, and operation keys 1302. Note that a main panel is actually provided on the outer surface of the lower case 1306; however, the main panel is not shown in FIG. 15.

The sub-panel 100 is configured using the liquid crystal device (reflective liquid crystal device that has an SRAM and that uses a lateral electric field mode liquid crystal) according to the embodiment of the invention. Because an image may be held in the SRAM, for example, when an image display of the sub-panel 10 is once ended to be switched to a display of the main panel (not shown) and, after that, a display of the sub-panel 1 is performed again, it is possible to redisplay an image only by reading out the data being held.

In addition, because the lateral electric field mode liquid crystal (IPS mode liquid crystal) is used, it is possible to perform a high-quality image display with high color developing property and high viewing angle. In addition, a direct-current offset does not occur owing to an ideal inversion of a voltage applied to the liquid crystal and an ideal short circuit of the electrodes of the liquid crystal when no voltage is applied, so that degradation of a display image with time is also reduced. Moreover, because the polarity inversion of a voltage applied to the liquid crystal is always symmetrically and quickly performed, the advantageous effects that no flicker occurs and no decrease in image quality occurs may be obtained. Furthermore, because the reflective liquid crystal device that does not require a backlight is used as a sub-panel, it is possible to extend the life of a battery. In this manner, in a period when data are written to the pixel circuits connected to one scanning line, a voltage of display data is not only supplied to the liquid crystal element but also supplied to the holding capacitor connected to the liquid crystal element. Thus, in a period when the next display data is written to the memory circuit in the pixel circuit, the input of the voltage inverter circuit is made to enter a floating state to thereby continuously display the preceding display data held in the holding capacitor on the liquid crystal element. Accordingly, while display data are being written in the memory circuit, the memory circuit is electrically isolated from the liquid crystal element and the holding capacitor to thereby not influence the data writing operation on the screen. Therefore, when a screen display is performed by means of line sequential driving or frame sequential driving, it is possible to prevent the occurrence of a flicker.

Low Power Consumption Portable Information Terminal

Figure 16:
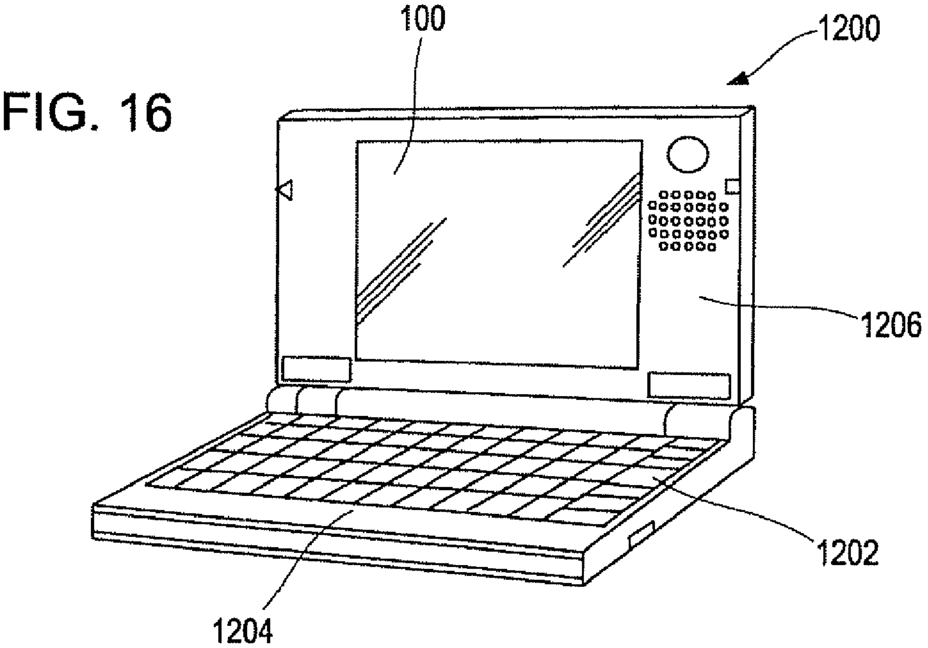
FIG. 16 is a perspective view of a portable information terminal (a PDA, a personal computer, a word processor, or the like) that uses the liquid crystal device according to the embodiment of the invention.

FIG. 16 is a perspective view of a portable information terminal (a PDA, a personal computer, a word processor, or the like) that uses the liquid crystal device according to the embodiment of the invention. The portable information terminal 1200 includes an upper case 1206, a lower case 1204, an input portion 1202, such as a keyboard, and a display panel 100 that uses the reflective liquid crystal device according to the embodiment of the invention. With this portable information terminal as well, the same advantageous effects as those of the above mobile terminal may be obtained.

Reflective Projector

Figure 17:
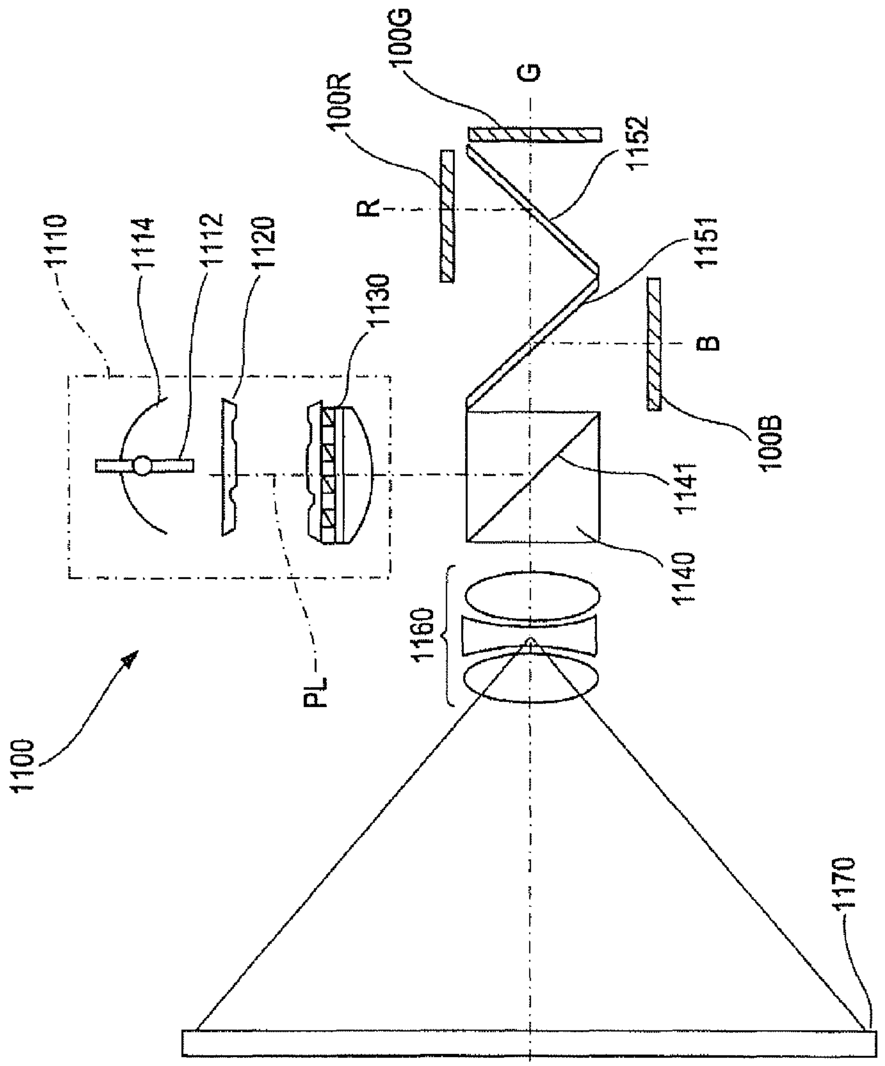
FIG. 17 is a view that shows the schematic configuration of a relevant part of a projector (projection display device) that uses the reflective liquid crystal device according to the embodiment of the invention as an optical modulator.
Figure 18A:
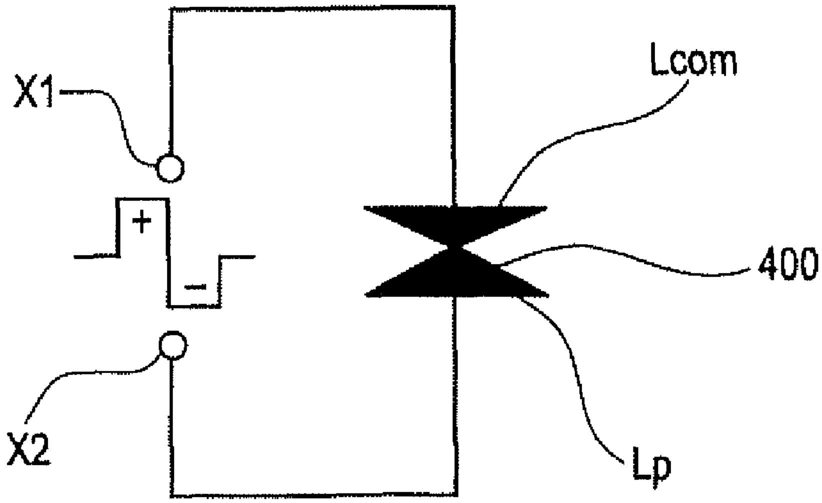
FIG. 18A and FIG. 18B are views that show the operation necessary to prevent the occurrence of burn-in in a liquid crystal device.
Figure 18B:
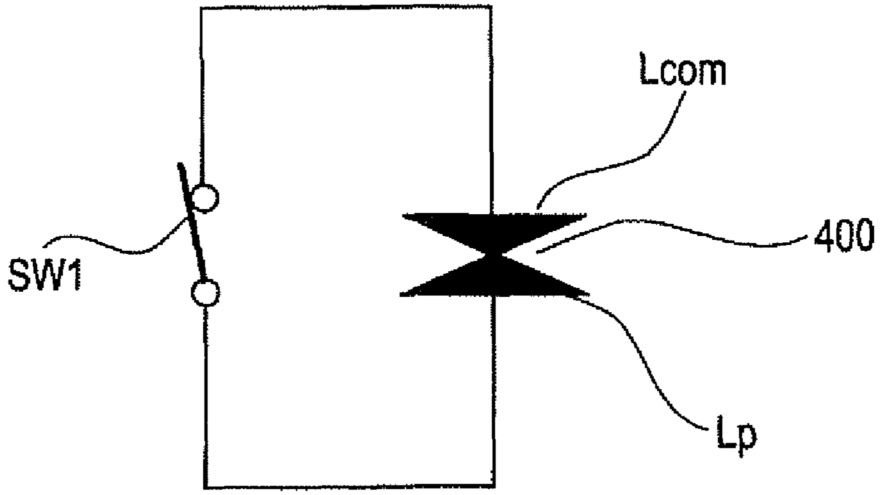
Figure 19A:
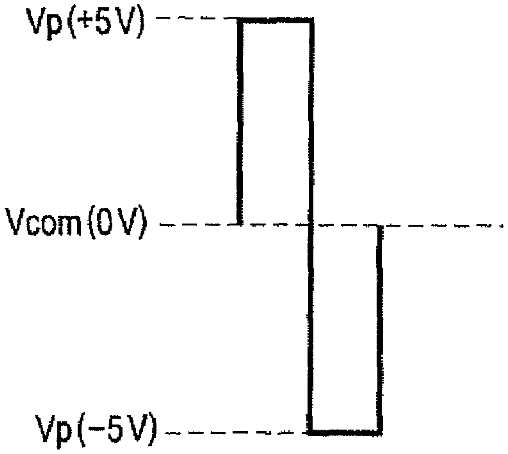
FIG. 19A to FIG. 19C are views that illustrate problems when voltages applied to the electrodes of a liquid crystal are inverted in a liquid crystal device that includes a memory circuit in each pixel circuit.
Figure 19B:
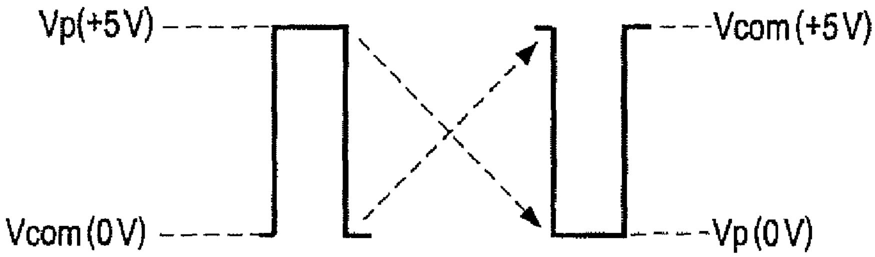
Figure 19C:
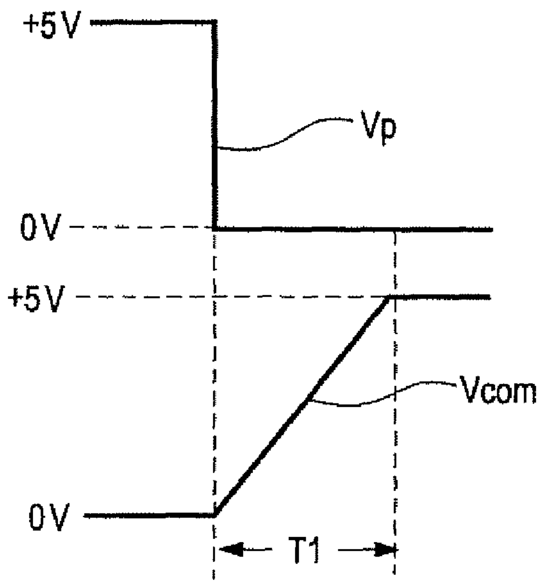
Figure 20A:
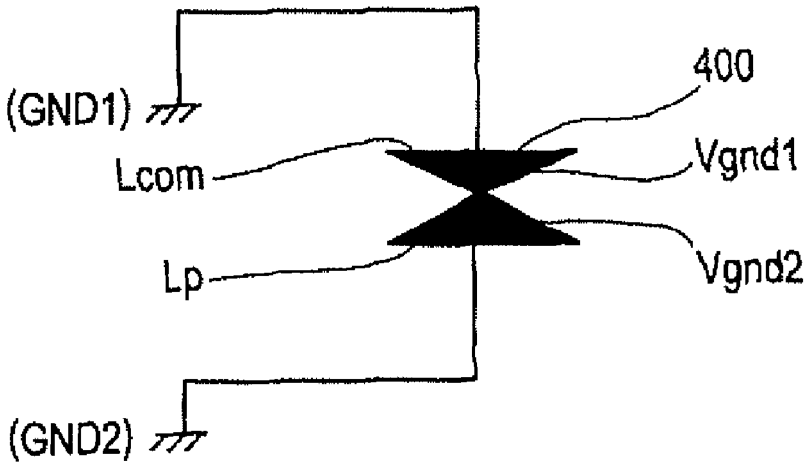
FIG. 20A and FIG. 20B are views that illustrate problems when the electrodes of a liquid crystal are short-circuited (in the same electric potential) in a liquid crystal device that includes a memory circuit in each pixel circuit.
Figure 20B:
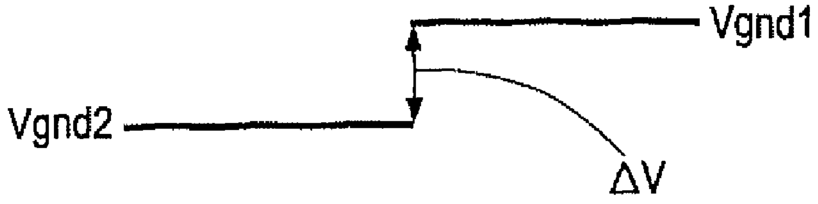

FIG. 17 is a view that shows a schematic configuration of a relevant part of a projector (projection display device) that uses the reflective liquid crystal device according to the embodiment of the invention as an optical modulator. As shown in the drawing, the projector 1100 includes a polarizer lighting device 1110, a projection optical system 1160, a polarization beam splitter 1140 (including a polarization beam reflection plane 1141), dichroic mirrors 1151, 1152, and reflective liquid crystal devices (100R, 100G, 100B), which correspond to colors of RGB, according to the embodiment of the invention as a light modulator.

As shown in the drawing, the polarizer lighting device 1110 is arranged along a system optical axis PL. In the polarizer lighting device 1110, light emitted from a lamp 1112 forms substantially parallel beams of light by being reflected on a reflector 1114 and enters a first integrator lens 1120. In this manner, light emitted from the lamp 1112 is split into a plurality of intermediate beams of light. These intermediate beams of light are converted into polarized beams of light (s polarized beams of light) of one kind, having substantially the same polarization direction by a polarization conversion element 1130 that includes a second integrator lens on the light incidence side, and then exits from the polarizer lighting device 1110.

The s polarized beams of light that exits from the polarizer lighting device 1110 are reflected on an s polarization beam reflection plane 1141 of the polarization beam splitter 1140. Among the reflected beams of light, beams of blue light (B) are reflected on a blue light reflection layer of the dichroic mirror 1151 and modulated by the reflective liquid crystal device 100B. In addition, among beams of light that pass through the blue light reflection layer of the dichroic mirror 1151, beams of red light (R) are reflected on a red light reflection layer of the dichroic mirror 1152 and modulated by the reflective liquid crystal device 100R.

On the other hand, among beams of light that pass through the blue light reflection layer of the dichroic mirror 1151, beams of green light (G) pass through the red light reflection layer of the dichroic mirror 1152 and modulated by the reflective liquid crystal device 100G.

In this manner, red, green and blue beams of light that are colored-light modulated by the liquid crystal devices 100R, 100G, 100B are sequentially composed by the dichroic mirrors 1152, 1151 and the polarization beam splitter 1140 and, after that, projected onto a screen 1170 by the projection optical system 1160. With this portable information terminal as well, the above described advantageous effects may be obtained.

The aspects of the invention are described on the basis of the embodiments; however, the aspects of the invention are not limited to the embodiments described above, but they may have various modifications and applications. For example, the transistors (switching elements) that constitute the voltage inverter circuit may employ a bipolar transistor. The memory circuit may employ a memory other than SRAM. In addition, the "lateral electric field mode liquid crystal" in the description widely includes a liquid crystal of various driving modes, in which an electric field applied to the liquid crystal layer is horizontal to the substrate plane.

As described above, according to the embodiments of the invention, the following main advantageous effects may be, for example, obtained. However, the liquid crystal device according to the aspects of the invention does not need to achieve all the advantageous effects described below at the same time, and the following list of the advantageous effects is not intended to limit the scope of the invention.

(1) The lateral electric field mode liquid crystal is actively employed to reduce a driving load and, thereby, a quick change in voltage of both of the electrodes of the liquid crystal is possible. In addition, a new configuration of pixel circuit that completely separates the function of voltage supply from the function of voltage inversion is employed, so that it is possible to realize a quick and highly accurate inversion of applied voltage using, for example, the complementary switch control signals (S0 to Sn, /S0 to /Sn). Furthermore, in a period when new display data is written to the memory circuit in the pixel circuit, by controlling the electric potentials of the switch control signals (S0 to Sn, /S0 to /Sn), the preceding display data is displayed on the liquid crystal element in such a manner that the voltage of the display data held in the holding capacitor is supplied to the liquid crystal element, and, at the time when the above wiring period ends, the voltage of new display data is applied to the liquid crystal element and the holding capacitor. Thus, it is possible to update the display data without any influence on a screen display. Hence, it is possible to perform a high-quality image display by means of line sequential driving or frame sequential driving without occurrence of a flicker.

(2) The voltage inverter circuit switches only a path of the power supply voltage (VDD, GND), supplied from the memory circuit, to the liquid crystal and a path of the reference power supply voltage (GND) of the voltage inverter circuit itself supplied to the liquid crystal. Thus, the voltage source of a voltage applied to the liquid crystal is always the same and, therefore, a voltage value does not change before and after inversion of voltage. Hence, an accurate voltage polarity inversion may be achieved. In addition, even when the voltage level in each pixel slightly changes due to the scatter of the liquid crystal within the plane, a voltage value does not change before and after inversion of voltage in that pixel and, as a result, a direct-current offset does not occur in each pixel. Accordingly, no burn-in occurs and no degradation of image with time occurs.

(3) In addition, because only the path to supply a voltage is switched, it is possible to realize switching of a voltage level supplied to each of the first and second pixel electrodes with a simple circuit at a time. It is not necessary to control the voltage Vcom of the common electrode and the voltage Vp of the lower electrode using separate circuits, adjust the voltages with high accuracy, and synchronize the timing to switch the voltages as in the case of the existing art. Thus, a control method is simplified.

(4) In addition, in a state when the reference power supply voltage of the voltage inverter circuit is, for example, a ground level, when the voltage supplied from the memory circuit is set to 0 V, the voltages applied to both the electrodes of the liquid crystal both become 0 V accurately. Thus, a short circuit state when no voltage is applied to the liquid crystal is realized, and, at this time, a direct-current offset does not occur. Accordingly, no burn-in occurs and no degradation of image with time occurs.

(5) In addition, the voltage inverter circuit may be, for example, formed of four switching elements (first to fourth transistors) provided between the voltage supply end of the memory circuit and the reference power supply electric potential, a synchronous switching control of the switching elements may be simply realized, for example, using the complementary switch control signals (S0 to Sn, /S0 to /Sn). Then, by setting the switch control signals (S0 to Sn, /S0 to /Sn) both to a low level, it is possible to obtain a data update period of the liquid crystal device. The voltage of the preceding display data held in the holding capacitor is applied to the liquid crystal element in a period when new display data is written to the memory circuit in the pixel circuit, it is possible to prevent a flicker from occurring on the screen because of update of display data. Moreover, the voltage inverter circuit is formed of minimum number of elements, so that it is possible to realize a compact circuit that cannot be simplified any longer.

(6) In addition, the high level side power supply voltage value of the memory circuit and the high level side power supply voltage value of the voltage inverter circuit may be the same and, thereby, the sizes of the MOS transistors that constitute the circuits may be the same. In addition, for example, the transistors that constitute the memory circuit need not have a high withstand voltage.

(7) In addition, the switch control signals (S0 to Sn, /S0 to /Sn) that drive the voltage inverter circuit are versatilely used in a digital circuit and, particularly, may be easily obtained by, for example, using a timing pulse in digital gray-scale driving (PWM driving). Thus, it is possible to simplify the circuit configuration (system configuration).

(8) In addition, when a control voltage that is equal to or more than (VDD+threshold voltage (Vth)) is applied to the gates of the first and third MOS transistors (M7, M9) that operate to supply a voltage from the memory circuit to the liquid crystal to sufficiently turn on the MOS transistors (M7, M9), a voltage (5 V=VDD) from the memory circuit is continuously supplied to the liquid crystal, so that a voltage drop does not occur.

(9) A switching element is provided to prevent a feedthrough current in the voltage inverter circuit, and, by turning off the switching element at a timing when a feedthrough current occurs, it is possible to reliably prevent the occurrence of feedthrough current. (10) In addition, the same ground line is shared by the memory circuit and the voltage inverter circuit in the pixel circuit. Thus, even when a voltage level (0 V) varies because of a scatter of the liquid crystal in the plane, or the like, because both the electric potentials change equally, as a result, no relative difference in electric potentials of voltage levels applied to both the electrodes of the liquid crystal occurs. When no voltage is applied to the liquid crystal, a short circuit state is realized with high accuracy and, hence, a direct-current offset does not occurs and, therefore, there is no possibility that a burn-in occurs. (11) In addition, in the case of the reflective liquid crystal, it is possible to provide an element forming region below each pixel electrode. Because the voltage inverter circuit according to the embodiment of the invention is simplified, it is not difficult to arrange the memory circuit and the voltage inverter circuit in a space formed below each of the pixel electrodes. Thus, without increasing an area occupied by the pixel circuit, it is possible to form the pixel circuit according to the embodiments of the invention. (12) The liquid crystal device according to the embodiment of the invention may be, for example, mounted on an electronic apparatus, such as a sub-panel of a cellular phone, a low power consumption notebook personal computer, or a reflective projector. In this case, a flicker of a still image in accordance with voltage inversion is suppressed, and a flicker is suppressed because a frame is not influenced in an update period of display data, so that it is possible to display a high-quality image. Moreover, occurrence of a direct-current offset is reduced and, thereby, a burn-in hardly occurs, so that degradation of quality of display image with time hardly occurs. Furthermore, the aspects of the invention are able to realize inversion of an applied voltage with high accuracy while suppressing a flicker with a simple circuit configuration and a simple control. In addition, when no voltage is applied to the liquid crystal, it is advantageous in that a short circuit state that prevents a direct-current offset may be realized. Thus, it is useful as a high-performance liquid crystal device (particularly, a reflective liquid crystal device) with less deterioration with time. In addition, the liquid crystal device according to the embodiment of the invention may be, for example, mounted on an electronic apparatus, such as a sub-panel of a cellular phone, a low power consumption portable information device (personal computer, or the like), or a reflective projector.

According to the aspects of the invention as described above, the memory and the voltage inversion circuit are provided in each of the pixels, and the new liquid crystal device and the pixel circuit that are able to perform line sequential driving and frame sequential driving are realized. Thus, a high-resolution image display may be performed and an electronic apparatus that is highly useable may be obtained.

The entire disclosure of Japanese Patent Application No. 2007-078758, filed Mar. 26, 2007 is expressly incorporated by reference herein.

What is claimed is:

1. A liquid crystal device having a plurality of pixel circuits, comprising:

a lateral electric field mode liquid crystal element that controls alignment of liquid crystal molecules by applying an electric field in a direction of a substrate plane to a liquid crystal layer, and that includes a first pixel electrode and a second pixel electrode;

a memory circuit that is provided in each of the plurality of pixel circuits and that functions as a source to supply a first voltage and a second voltage;

a voltage inverter circuit that is provided in each of the plurality of pixel circuits, and that inverts a voltage applied to the liquid crystal element by switching the supply of each of the first and second voltages, supplied from the memory circuit, between the first pixel electrode and the second pixel electrode of the liquid crystal element; and a holding capacitor that holds a voltage applied to the liquid crystal element, wherein the voltage inverter circuit includes a first switching element and a second switching element that are connected in series between an end of the memory circuit, from which the first and second voltages are supplied, and a reference power supply electric potential, wherein the voltage inverter circuit further includes a third switching element and a fourth switching element that are connected in series between the end of the memory circuit, from which the first and second voltages are supplied, and the reference power supply electric potential, wherein one end of the holding capacitor is connected to at least one of a common connecting point of the first and second switching elements and a connecting point of the third and fourth switching elements, wherein the first pixel electrode and the second pixel electrode of the liquid crystal element are respectively connected to the common connecting point of the first and second switching elements and the common connecting point of the third and fourth switching elements, and wherein whether to selectively turn on the first and fourth switching elements, to selectively turn on the second and third switching elements, or to turn off all the first to fourth switching elements, are controlled by switch control signals.

2. The liquid crystal device according to claim 1, wherein the holding capacitor is connected between the common connecting point of the first and second switching elements and the common connecting point of the third and fourth switching elements.

3. The liquid crystal device according to claim 2, wherein each of the first, second, third and fourth switching elements is formed of the same conductivity type transistor, wherein in a period when a voltage applied to the liquid crystal element is updated, the first and third switching elements and the second and fourth switching elements are complementarily driven by the switch control signals having opposite phases from each other, and wherein in a period when a voltage applied to the liquid crystal element is held in the holding capacitor, the first and third switching elements and the second and fourth switching elements all are turned off by the switch control signals.

4. The liquid crystal device according to claim 3, further comprising a plurality of scanning lines, wherein in a period when display data is written to the memory circuit provided in one of the plurality of pixel circuits connected to one of the plurality of scanning lines, the first and third switching elements and the second and fourth switching elements, which constitute the voltage inverter circuit provided in one of the plurality of pixel circuits connected to one of the plurality of scanning lines, are all turned off, and wherein when writing of the display data to the memory circuit provided in one of the plurality of pixel circuits connected to one of the plurality of scanning lines has been completed, the first and second switching elements and the third and fourth switching elements are turned on, and a voltage of the updated display data is applied to the liquid crystal element.

5. The liquid crystal device according to claim 3, further comprising a plurality of scanning lines, wherein in a period when display data is written to the memory circuit provided in each of the plurality of pixel circuits connected to all of the plurality of scanning lines, the first and third switching elements and the second and fourth switching elements, which constitute the voltage inverter circuit provided in each of the plurality of pixel circuits connected to all of the plurality of scanning lines, are all turned off, and wherein when writing of the display data to each memory circuit provided in each of the plurality of pixel circuits connected to all of the plurality of scanning lines has been completed, the first and second switching elements and the third and fourth switching elements are turned on, and a voltage of the updated display data is applied to the liquid crystal element.

6. The liquid crystal device according to claim 1, wherein one end of the holding capacitor is connected to the common connecting point of the first and second switching elements or the common connecting point of the third and fourth switching elements, and the other end of the holding capacitor is connected to a predetermined direct-current electric potential.

7. The liquid crystal device according to claim 1, wherein each of the memory circuits is an SRAM memory cell that holds a 1-bit data.

8. The liquid crystal device according to claim 1, wherein the lateral electric field mode liquid crystal element is an IPS (In-Plane Switching) mode liquid crystal element.

9. The liquid crystal device according to claim 1, wherein the liquid crystal device is a reflective liquid crystal device, and wherein each of the memory circuits and each of the voltage inverter circuits are arranged in an element forming region below the first and second pixel electrodes formed of a material that reflects light.

10. An electronic apparatus comprising the liquid crystal device according to claim 1.

11. An active matrix substrate comprising:

a first pixel electrode;

a second pixel electrode, wherein the first pixel electrode and the second pixel electrode are used to apply an electric field to a liquid crystal layer of a lateral electric field mode liquid crystal element;

a memory circuit that functions as a source to supply a first voltage and a second voltage;

a voltage inverter circuit that inverts a voltage applied to the liquid crystal element by switching the supply of each of the first and second voltages, supplied from the memory circuit, between the first pixel electrode and the second pixel electrode of the liquid crystal element such that the first voltage is supplied to the first pixel electrode when the second voltage is supplied to the second pixel electrode, and the second voltage is supplied to the first pixel electrode when the first voltage is supplied to the second pixel electrode; and a holding capacitor that holds a voltage applied to the liquid crystal element.

* * * * *